US007663538B2

(12) United States Patent
Montanyà Silvestre

(10) Patent No.: US 7,663,538 B2
(45) Date of Patent: Feb. 16, 2010

(54) ELECTROMAGNETIC SIGNAL EMITTING AND/OR RECEIVING DEVICE AND CORRESPONDING INTEGRATED CIRCUIT

(75) Inventor: Josep Montanyà Silvestre, Rubi (ES)

(73) Assignee: Baolab Microsystems S.L., Barcelona (ES)

( * ) Notice: Subject to any disclaimer, the term of this patent is extended or adjusted under 35 U.S.C. 154(b) by 179 days.

(21) Appl. No.: 11/579,038

(22) PCT Filed: May 12, 2005

(86) PCT No.: PCT/EP2005/005311

§ 371 (c)(1),
(2), (4) Date: Oct. 30, 2006

(87) PCT Pub. No.: WO2005/112190

PCT Pub. Date: Nov. 24, 2005

(65) Prior Publication Data

US 2008/0024357 A1 Jan. 31, 2008

(30) Foreign Application Priority Data

May 18, 2004 (ES) ................................ 200401275

(51) Int. Cl.
*H04B 7/00* (2006.01)

(52) U.S. Cl. ...................................................... 342/350
(58) Field of Classification Search .................. 342/350
See application file for complete search history.

(56) References Cited

U.S. PATENT DOCUMENTS 7,224,247 B2 * 5/2007 Dean .......................... 333/161

* cited by examiner

*Primary Examiner*—Thomas H Tarcza
*Assistant Examiner*—Harry Liu
(74) *Attorney, Agent, or Firm*—Staas & Halsey LLP

(57) ABSTRACT

Electromagnetic signal emitting and/or receiving device and corresponding integrated circuit. The electromagnetic signal emitting and/or receiving device defines a minimum operational bandwidth and includes one or several arrays of antennas, each having at least one antenna, and which generate an output signal corresponding to the output signal generated by an hypothetical antenna equal to this antenna, when the hypothetical antenna is performing a periodic movement, preferably a rotation or combination of rotations. The periodic movement must have a frequency higher than a minimum operational bandwidth. In this manner the directivity of the antennas can be affected by changing their radiation pattern, being possible to obtain high directivity devices. The periodic movement can be replaced by an array of fixed antennas oriented in space and sequentially connected by miniaturized relays.

10 Claims, 19 Drawing Sheets

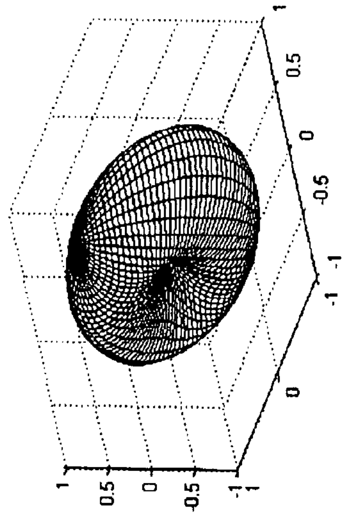
FIG. 1
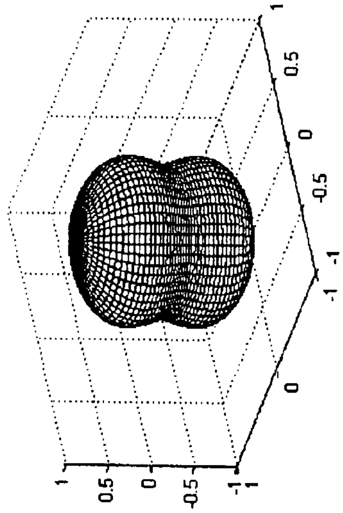
FIG. 2.1
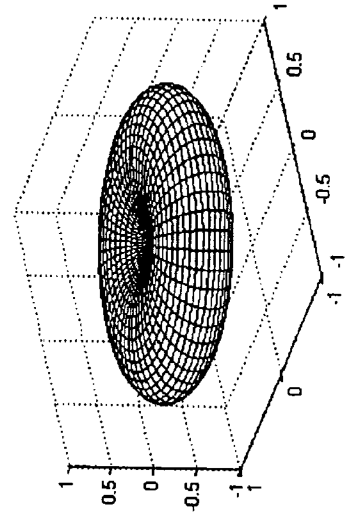
FIG. 2.2
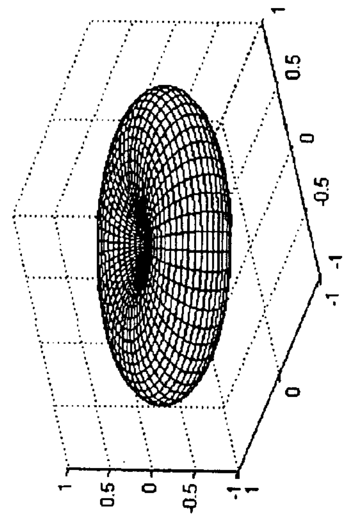
FIG. 2.3

FIG. 5
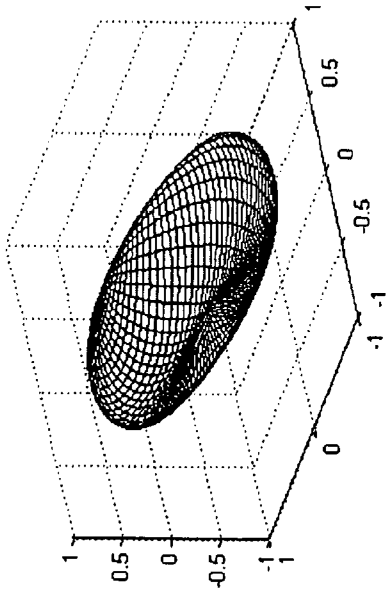
FIG. 6.1
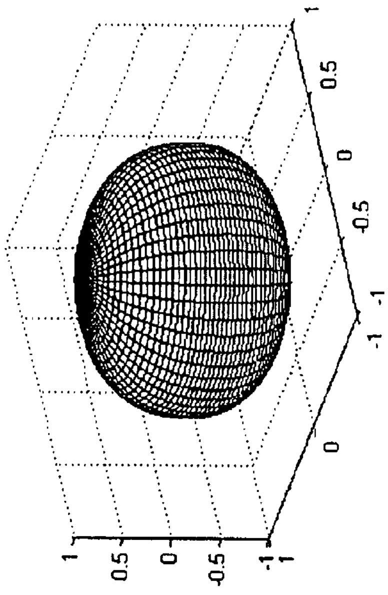
FIG. 6.2
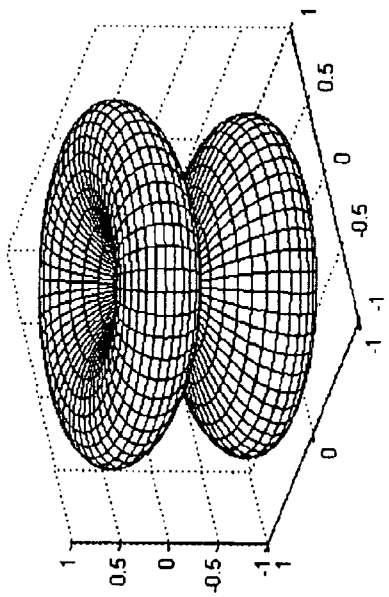
FIG. 6.3
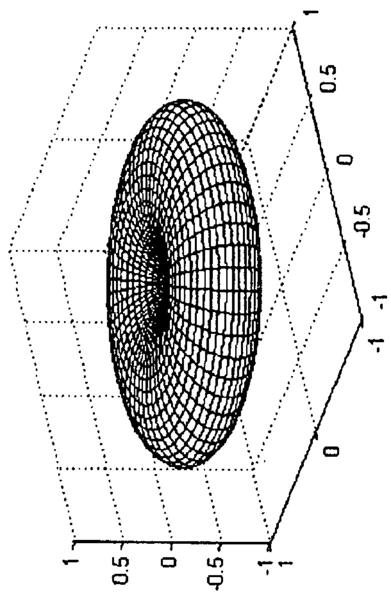

ELECTROMAGNETIC SIGNAL EMITTING AND/OR RECEIVING DEVICE AND CORRESPONDING INTEGRATED CIRCUIT

FIELD OF THE INVENTION

The invention relates to an electromagnetic signal emitting and/or receiving device defining a minimum operational bandwidth and comprising at least a first array of antennas, formed by at least one antenna. The invention further relates to integrated circuits comprising emitting and/or receiving devices according to the invention.

STATE OF THE ART

There are multiple electromagnetic signal emitting and/or receiving devices. A characterising property of these devices is their radiation pattern. The radiation pattern can be modified in different ways, depending on the needs of the equipment, thus, it can be interesting to obtain radiation patterns that are highly uniform in all the space, in order to emit in a highly uniform fashion or to receive with the same power in any direction. Alternatively it can be interesting to have devices with radiation patterns having an maximum power area of transmission/reception and other areas wherein the transmission and/or reception power is very reduced. The directive emitting and/or receiving devices that allow emitting and/or receiving from a certain direction, have several advantages such as for example the higher efficiency of the emitted energy, and the lower pickup of noises from undesired directions.

It is possible to obtain directive emitting and/or receiving devices by a geometric design suitable for them. In general these devices comprise an antenna that physically emits and/or receives the electromagnetic signal. It is also possible to obtain directive emitting and/or receiving devices by arranging, in the space, several antennas, forming arrays of antennas. In this case, the distribution in the space is influenced by the transmission/reception frequency, being necessary to use longer distances when frequencies are lower. That causes problems in case of working at low frequencies, as the necessary distances can be remarkable.

Although, in theory, it is possible to have electromagnetic signal emitting and/or receiving devices operating in the same way for any frequency, in the praxis, emitting and/or receiving devices are designed to be used in certain bandwidths, due to the fact that both geometric determining factors of the antennas and electronic determining factors associated to them usually define bandwidths wherein the device is really effective. In this sense any actual emitting and/or receiving device defines a minimum operational bandwidth, which is that bandwidth for which the device has been designed and for which it is capable of offering the minimum prescribed performances.

In general there is the need of developing electromagnetic signal emitting and/or receiving devices that would be highly directive. There is also the need of developing electromagnetic signal emitting and/or receiving devices of reduced dimensions.

SUMMARY OF THE INVENTION

The objective of the invention is to overcome these drawbacks. This objective is achieved by means of an electromagnetic signal emitting and/or receiving device of the type above indicated characterised in that the first array generates an output signal corresponding to the output signal generated by an hypothetical antenna equal to said antenna, when the hypothetical antenna is performing a first periodic movement, wherein this first periodic movement has a first frequency higher than the minimum operational bandwidth.

In fact, when forcing an antenna to perform a periodic movement, its radiation pattern is modified. As it will be commented below, a "well chosen" periodic movement allows to modify the radiation pattern in order to make it more directive, and that allows to modify the radiation pattern of the emitting and/or receiving device without being necessary to modify the radiation pattern of the antenna included in said emitting and/or receiving device. Likewise as it will be observed below it is necessary that the frequency of the periodic movement would be higher than the minimum operational bandwidth, in order to avoid undesired interferences. The periodic movement can be any in general, such as simple rotating movements, rotating movements according to several axis, complex closed movements and even not closed movements, such as for example pendulous movements, although preferably movements are rotations according to an axis or according to several axis.

Likewise as it will be observed below, the antenna (or antennas) of the emitting and/or receiving device can physically perform the periodic movement, and in that case the antenna will generate an output signal identical to the hypothetical antenna performing the same periodic movement, or the antenna (or antennas) of the emitting and/or receiving device can generate an output signal that corresponds to the signal generated by the hypothetical antenna. In this case the two signals are not identical, but the signal generated by the emitting and/or receiving device corresponds to the signal that the hypothetical antenna would generate, and this correspondence allows that subsequently an electronic circuit would be able to obtain the same result than with the signal of the hypothetical antenna.

Preferably, the electromagnetic signal emitting and/or receiving device is a micro-mechanism, usually called MEMS (micro electromechanical system). In this manner it is possible to group the device in a very reduced space. In this sense, preferably the device is included in an integrated circuit, that can be monolithic or hybrid.

BRIEF DESCRIPTION OF THE DRAWINGS

Other advantages and characteristics of the invention will become evident from the following description in which, entirely non-limitatively, are described some preferential embodiments of the invention, with reference to the appended drawings. The figures show:

FIG. 1, a radiation pattern of a dipole.

FIGS. 2.1, 2.2 and 2.3, radiation patterns of the dipole of FIG. 1, when being rotated about its longitudinal axis.

FIG. 5, a radiation pattern of the dipole of FIG. 1, positioned in such a way that its longitudinal axis forms an angle of 63° with the horizontal.

FIGS. 6.1, 6.2 and 6.3, radiation patterns of the dipole FIG. 1, when being rotated about a rotation axis forming an angle $\alpha$=63° with its longitudinal axis.

DETAILED DESCRIPTION OF SOME EMBODIMENTS OF THE INVENTION

FIG. 1 shows the radiation pattern of a particularly simple antenna: a horizontally arranged dipole (the null power point of radiation corresponds to the axis of the dipole). If the dipole is rotated about a vertical axis, the obtained radiation pattern corresponds to that of FIG. 2. The gain with which the antenna will amplify the received signal in a certain direction will be a temporary function G(t). In a simplified manner it can be considered as a function with an absolute term plus a pure sinusoid term:

$$G(t)=G_0+G_B\cos(2\pi f_0 t)$$

The received signal is a bandpass signal, with its lowest frequency much higher than the rotation frequency of the antenna.

The voltage $v_i$ in the terminals of the antenna will be of $$v_i(t)=w_i(t)\cdot G(t)=G_0\cdot w_i(t)+G_B\cdot w_i(t)\cdot\cos(2\pi f_0 t)$$

Figure 3:
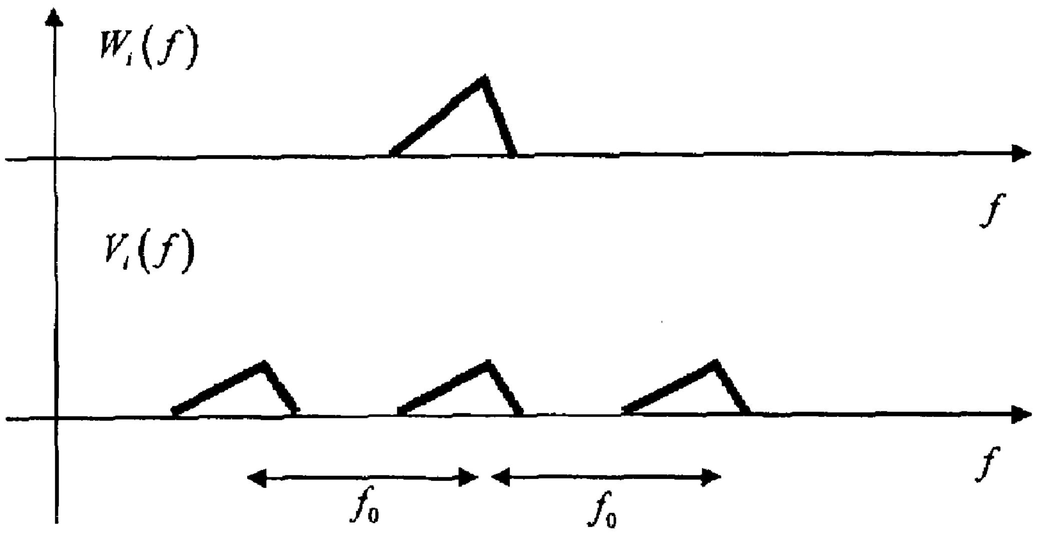
FIG. 3, a frequency diagram of the received signal ($W_i(f)$) and the voltage ($V_i(f)$) generated by the dipole of FIG. 2.

If it is analysed from a frequency point of view, it must be taken into account that the spectrum $V_i$(f) of the signal $v_i$(t), with respect to the spectrum $W_i$(f) of the received signal $w_i$(t) has the formula shown in FIG. 3. As it can be seen the input spectrum is divided into two parts, a first part with the same form and band than the input signal, due to the absolute term $G_0$ of the gain G(t), and a second part formed by two bands due to the modulating term $G_B\cdot\cos(2\pi f_0 t)$. The frequency $f_0$ is the fundamental frequency or first harmonic of the periodic movement. For this reason it is necessary that this frequency would be higher than the minimum operational bandwidth, as otherwise the bands due to the modulating term overlap with the band due to the absolute term. Depending on the values $G_B$ and $G_0$, there will be more power in the central band or in the modulated bands.

Then it is possible to filter two of the obtained bands. Preferably the modulated bands are filtered, although it would be possible to filter the central band and one of the modulated bands in order to maintain the other one of the modulated bands.

In general the received signal will be weak, due to the fact that the gain of $G_i$ in each direction depends on the gain variations around a complete rotation of the antenna in that direction and the chosen component, being either the central band (continuous component) or one of the sidebands (an harmonic, either the first, corresponding to the rotation fundamental frequency or to the periodic movement of the antenna, or one higher, because in a real case, not simplified such as that used in the explanation, there will be more than one harmonic), can be small, according to the form of the gain function G(t). In this manner an equivalent radiation pattern can be defined, being the one that the antenna has when it is rotating (in general moving with any periodic movement). Thus, FIGS. 2.1, 2.2 and 2.3 show the radiation patterns corresponding to the dipole of FIG. 1, when it is rotated about a vertical axis (i.e., an axis that is 90° from the dipole axis). FIG. 2.1 shows a radiation pattern of the central band, FIG. 2.2 shows a radiation pattern of the sideband corresponding to the first harmonic or fundamental frequency, and FIG. 2.3 shows the radiation pattern of the sideband corresponding to the second harmonic. As it can be observed the radiation pattern of FIG. 2.1 is clearly different from the radiation pattern of FIG. 1 although the corresponding antenna is still a dipole. Moreover, the directivity has been also modified (D=1.5 for the static dipole and D=1.5156 for the rotating dipole). That already indicates that it is possible to achieve "directive dipoles" thanks to forcing the dipole to perform certain rotation movements.

Figure 4:
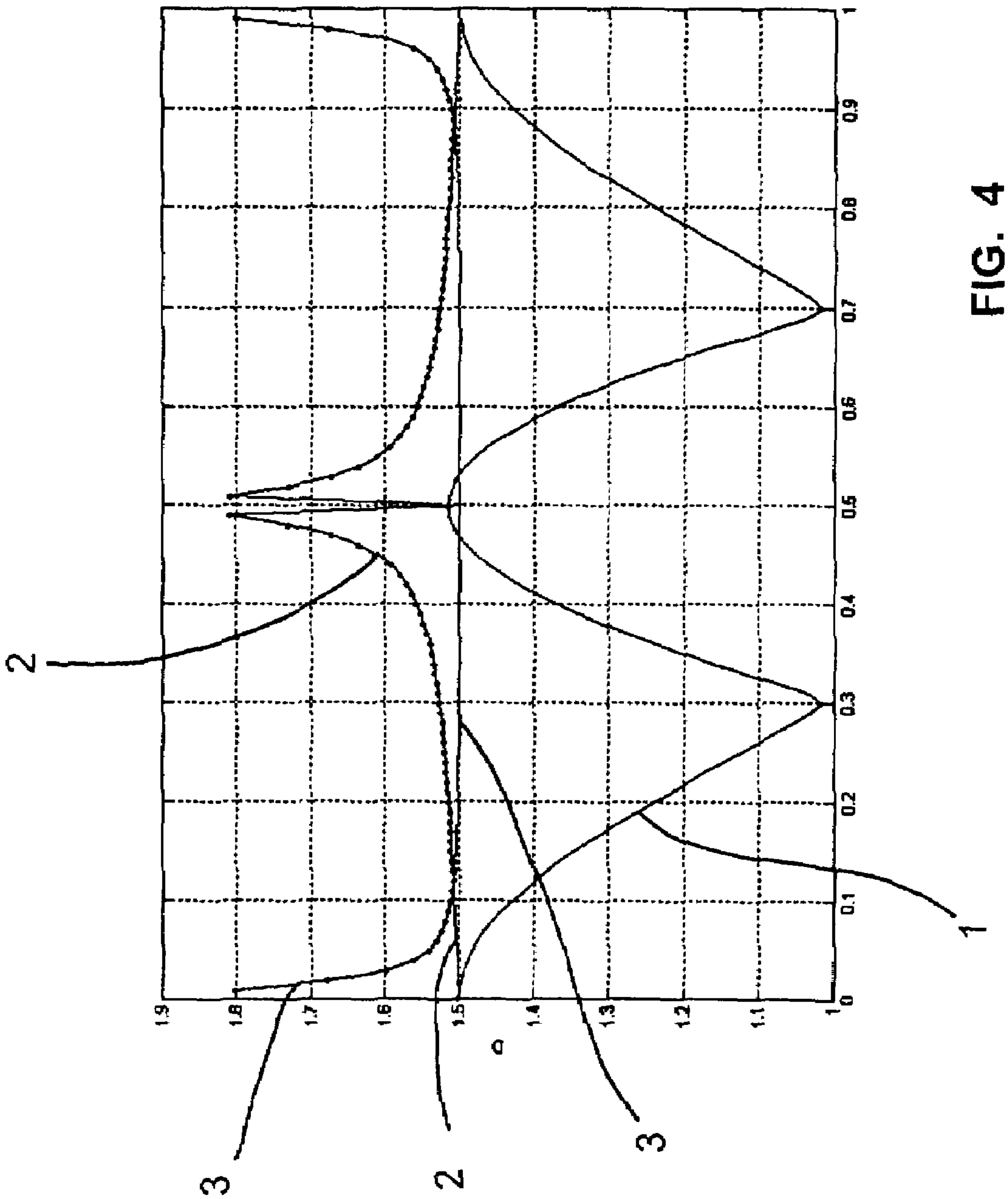
FIG. 4, an directivity evolution diagram (D) of a dipole depending on the angle ($\alpha$) between the longitudinal axis of the dipole and its rotation axis.

Thus it is possible to obtain a plurality of new and different radiation patterns simply by forcing antennas with known radiation patterns to properly chosen periodic movements. Thus, for example, in the case of the above dipole, a plurality of radiation patterns can be obtained by modifying the rotation angle of the dipole. FIG. 4 shows how the directivity of the radiation pattern of the dipole that is forced to rotate varies depending on the angle α between the dipole axis and the rotation axis (expressed in radians). Curve 1 corresponds to the central band, curve 2 corresponds to the sideband of the first harmonic or fundamental frequency and curve 3 corresponds to the sideband of the second harmonic. Additionally, it has been marked with points which of the three curves has the maximum directivity for a given rotation angle, and that shows which of the bands would be preferable to use as emitted or received signal.

By way of example, FIG. 5 shows an static dipole rotated 63° (0.35π radians) with respect to the vertical axis. When this dipole is made to rotate according to the vertical axis, the radiation patterns have the appearance shown in FIGS. 6.1 (central band), 6.2 (sideband of the first harmonic or fundamental frequency) and 6.3 (sideband of the second harmonic). As it can be observed, in this specific case the highest directivity is achieved in the sideband of the first harmonic or fundamental frequency (D=1.5349). With other angles (see FIG. 4) directivities until approximately 1.8 are possible.

Preferably the device comprises a plurality of arrays of antennas, comprising each one of said arrays at least one antenna, wherein each array generates an output signal corresponding to the output signal generated by the already cited hypothetical antenna when it is performing a periodic movement, wherein the periodic movement has a frequency higher than the minimum operational bandwidth and wherein the frequencies corresponding to each of the output signals of each one of the arrays are different with respect to one another. In fact, thereby different problems can be solved:

a) on the one hand, in the case of receiver devices, there is the need of filtering certain components of the received signal. Firstly, the modulated bands must be filtered (in the case that one wishes to work with the central band) and that can be achieved with a band pass filter. Nevertheless, it can occur that the antenna is receiving outer signals with frequencies substantially corresponding to that of the modulated bands. These outer signals will be filtered by the cited band pass filters, but these outer signals will have also suffered a modulation, and one of its modulated signals will fall on the central band of the signal that is interesting for us, by introducing a noise in it. This drawback can be corrected if it is included a plurality of arrays of antennas (in general, moving with a periodic movement) at mutually different speeds as, in this case, the following phenomenon takes place:

a. 1) all the central bands of the signal that is interesting for us fully coincide, as they are not function of the rotation frequency, and their amplitudes are added.

a.2) all the sidebands overlap with respect to one another at random, as their positions depends on the rotation movement frequency (in general, of the periodic movement). Therefore, in said cases they are mutually cancelled. Anyway, these sidebands are properly filtered by the band pass filters.

a.3) central bands of noises are likewise filtered by band pass filters.

a.4) the really important effect takes place with the modulated bands of the noises, particularly with those falling within the central band of the signal that is interesting for us. These modulated bands suffer a similar effect to that described in a.2): they mutually overlap in a non correlated fashion, so that a plurality of cancellations takes place. In this manner the remaining noise is minimised while the signal (point a.1) increases its amplitude in proportion to the amount of the used arrays of antennas.

b) on the other hand, in the case of emitting devices, it is not possible to remove the modulated bands by filtering. However, this problem can also be corrected in a great extent if a plurality of arrays of antennas rotating (in general, moving with a periodic movement) at mutually different speeds is included. In this case, each array of antennas emits the desired signal, and a plurality of undesired modulated bands. However, not all the modulated bands coincide with respect to one another, due to the fact that the rotation speeds (in general, the periodic movement) are different with respect to one another. That will cause multiple cancellations and the signal of the modulated bands will have low power. Given that the power of the central band will be increased, the power difference between the central band and the modulated bands will be able to become as high as requested, simply by providing more radiating arrays of antennas. In this manner it can be achieved that the sidebands are reduced to a background noise that does not affect the transmission.

In general, a way of increasing the total power of the emitting/receiving device is by providing a plurality of mutually parallel connected identical antennas. Both in the above cases and in those that will be described below, this solution allows to increase the power as much as wished, by simply increasing the number of antennas. This is particularly the case if the antennas are micromechanisms: each of them will receive (or emit) an extremely reduced power, but the micromechanism technology allows to group hundreds or thousands of individual antennas so that the sum of their signals allows to obtain the desired powers.

Advantageously at least one of said arrays of antennas is perpendicularly oriented and dephased 90° with respect to another of said arrays of antennas. In fact, it must be taken into account that, given that the antenna is continuously being rotated, in general one will not be able to use linear polarisations. Should an antenna that is a dipole be used, we will have a polarisation loss factor of $$C_p=2=3\ \text{dB}$$

due to the fact that the polarisation of the dipole is linear, and receive signals having circular polarisation must be processed. Should a rotating antenna be used as receiving antenna, the receive antenna will have to generate a circularly polarised signal. Should a rotating antenna be used as emitting antenna, the receive antenna will have to be circularly polarised. Normally that avoids the use of a rotating antenna with linear polarisation simultaneously in both communication ends. That can be avoided by using an antenna having circular polarisation, and that can be achieved, for example in the case of dipoles, with two antennas (in general, two arrays of antennas) perpendicularly oriented and with a lag of 90° with respect to one another, thereby having a circular polarisation in both transmission ends. Should bigger antennas be directly used, that are circularly polarised, then it will not be necessary to make this phase shift.

In general, although the use of circular polarisations simplifies the design, the function $G(t)C_p(t)$ should be considered, i.e. the multiplication of the gain of the antenna $G(t)$ and the polarisation losses $C_p(t)$, instead of only function $G(t)$, for calculating the radiation patterns obtained when rotating the antenna.

As it has been already indicated above, preferably at least one of said periodic movements is a rotation or a combination of a plurality of rotations. The rotations are movements simple to generate. Choosing a rotation or a composition of rotations will depend on the antenna to be rotated and on the radiation pattern that is wished to be obtained.

The periodic movement can be performed in different ways. On the one hand, a preferable solution is that at least one of the arrays of antennas really performs the periodic movement corresponding of an actual form and of a continuous form, as in the examples above commented. In this case, preferably the movement would be performed by micromotors, i.e. by motors manufactured through micromechanism (MEMS) technologies as thereby it is possible to manufacture all the emitting and/or receiving device in a particularly reduced and compact fashion. The micromechanisms allow to reach very high rotation speeds at very reduced costs, so that micromotors rotating at more than 30,0000 revolutions per minute (r.p.m.) are possible.

Another alternative is performing the movement, but not in a continuous fashion but rather in an gradual fashion, so that the antenna performs short and fast movements among which it introduces short off periods. The output signal will be almost equal to the output signal of an hypothetical antenna performing the movement in a continuous fashion, but it will be discretized, or quantified, and that, in fact, is a phenomenon that also takes place in the case of a digitalisation of the signal. In this case, the output signal of the hypothetical signal (that moves in a continuous fashion) is not identical in strict sense to the output signal of the antenna of the device (that moves "by jumps"), but it is very similar and allows to obtain (or emit) the desired information. In this sense in the present description and claims the term "corresponding" has been used: the two signals are not identical with respect to one another, but the actual signal is a discretization of the hypothetical signal, corresponding to the stop of the periodic movement in certain moments (with the antenna in certain orientations chosen between the orientations that the hypothetical antenna takes up), and to the “instantaneous” jump of the antenna from one orientation to the following one.

A third alternative is that at least one of the arrays of antennas includes a plurality of fixed antennas oriented in the space in a mutually different way, so that each of said antennas have an orientation coinciding with one of the momentary orientations of the corresponding hypothetical antenna. In fact, in this manner it is not necessary to perform a physical movement of the antenna but rather there is a plurality of antennas, each arranged in one of the orientations chosen from the previous alternative, and in each moment it is connected to the output circuit the antenna having the corresponding orientation (or as near as possible) to that of the hypothetical antenna in continuous movement. In this case it is necessary to have a whole array of antennas, that in this alternative cannot be formed by a single antenna but rather it must be formed by a plurality of antennas, in order to obtain the effect corresponding to that of an hypothetical antenna. In return, it is possible to simulate a periodic movement simply by a plurality of properly mutually connected static antennas, and with a control circuit connecting and disconnecting them in a specific sequency fashion. It must be taken into account that in the case of being necessary that the minimum operational bandwidth would be 5 KHz (such as for example for the case of telephonic applications), that requires rotation speeds of 300,000 r.p.m. With this alternative it is not necessary to reach these rotation speeds in a mechanic fashion but rather they are achieved in a “virtual” fashion. Instead of rotation speeds, it is necessary to have a greater amount of antennas and a high switching speed, and that is technically less complex.

Advantageously the device according to the invention comprises a transformer circuit at the output of each antenna or array of antennas that modifies the array output signal (i.e. that of each array of antennas) or the local output signal (i.e., the output signal of each antenna) of at least one of the arrays of antennas or of at least one of the antennas, so that the output signal (array or local) can have positive and negative values, and thereby the output signal (array or local) is multiplied by a function B(t). This transformer circuit can be arranged at the output of each antenna or array of antennas and not only at the end of the whole assembly. Preferably the transformer circuit (that, conceptually, is an amplifier) simply reverses the polarity of the output signal (array or local), so that function B(t) can only have one of the two values +1 y −1 in each moment. In order to achieve a transformer circuit with these characteristics it is preferably used a transformer circuit comprising miniaturised relays (preferably miniaturised relays according to the invention) as thereby the introduction of the noises present in active devices is reduced and the limitation of the bandwidth derived from using active elements is prevented. In the case of the configuration of an array of fixed antennas that connect/disconnect with relays in order to simulate the movement of the hypothetical antenna (that has been previously described), these relays can be used to reverse or not the signal (array or local) in each moment (i.e., multiply by +1 or −1). Alternatively, it is possible to include in the transformer circuit active amplifiers. In this manner it is possible to achieve that function B(t) adopts any real value (and not only +1 y −1) and that will allow to improve even more the directivity of the assembly, in spite of the possible increase of internal noise and the possible reduction of the admissible bandwidth.

Should the physical movement of the antennas not be performed but only simulated by means of a plurality of fixed antennas properly oriented in the space and properly interconnected, as it has been already previously commented, and should these antennas further have a transformer circuit that amplifies their signal (array or local), then it is possible to design a particularly advantageous embodiment of the invention, that consists in keeping the antennas always connected instead of connecting and disconnecting them, and preferably function B(t) is constant and it does not depend on time. In fact should the central band of the signal be interesting it is possible to keep the antennas always connected, each one of them with a fixed gain amplifier along time, and so that all the output signals (array or local) are added, without being necessary in this case to make any filtering to obtain the desired continuous band. In this manner a more simple design is obtained and the possible problems of high frequency are reduced. In this case it is a system of N antennas wherein each antenna i has a gain $G_{ij}$, in which j specifies the direction. Each antenna i will have a voltage $v_i$ in its terminals. The group of received/emitted signals of the space in each direction j is $w_j$. In this manner should the device act as a receiver device, the following expression can be written:

$$[v_i]=[G_{ij}]\cdot[w_i]$$

being possible to obtain the value of $w_j$ as a linear combination of $v_j$;

If the device is acting as an emitting device, then the following expression can be written:

$$[w_j]=[G_{ji}]\cdot[v_i]$$

in this case the values of $v_i$ are the ones that can be obtained as a linear combination of values $w_i$. Given that, for a highly directive antenna, we use to have the expression $$w_j=\delta_{jk}V_i(t)$$

wherein $\delta_{jk}$ is the Kronecker delta, i.e. $w_j=V_i(t)$ for the direction (j=k) and $w_j=0$ for all the other directions. That means that each antenna will be supplied by a variable gain amplifier. The gain of each amplifier will be different, and it will depend on the direction in which one wishes to emit. The directivity of this device is proportional to the amount of antennas, being possible to reach directivity values as high as wished. Given that in the case of designs of this type with a high directivity the received signal will be low and the internal noise problems can be important, it can be advisable to reduce the temperature of the device through some cooling device, such as for example by including a Peltier cell in the same integrated circuit. Another advantage of a device of this type is that it can be electronically directed towards any direction, simply by modifying the amplification values of the amplifiers that take part in the linear combination of the signals. That can be easily achieved by using miniaturised relays.

In general, a preferable way of improving the ratio sign/noise of the device in general and/or of each antenna in particular consists in cooling at least one antenna through a Peltier effect cell.

As it has been previously said, preferably the device is a micromechanism. In this case it is particularly advantageous to provide the device with miniaturised relays, so that the antennas are mutually connected by miniaturised relays. Furthermore, in the event of using simultaneously micromachined antennas and miniaturised relays, it is possible to include all the assembly, in a printed circuit, eventually with the corresponding control circuit. Preferably miniaturised relays must allow to establish electric connections with a very high switching speed, to work in a very high frequency range, and to have a very low connection resistance.

Currently there are various alternatives for the production of miniaturised relays, in particular, in the context of technologies known as MEMS technology (micro electromechanical systems), Microsystems and/or Micromachines. In principal such may be classified according to the type of force or actuation mechanism they use to move the contact electrode. The classification usually applied is thus between electrostatic, magnetic, thermal and piezoelectric relays. Each one has its advantages and its drawbacks. However miniaturisation techniques require the use of activation voltages and surfaces which are as small as possible. Relays known in the state of the art have several problems impeding their advance in this respect.

A manner of reducing the activation voltage is precisely to increase the relay surface areas, which renders miniaturisation difficult, apart from being conducive to the appearance of deformations reducing the useful life and reliability of the relay. In electrostatic relays, another solution for decreasing the activation voltage is to greatly reduce the space between the electrodes, or use very thin electrodes or special materials, so that the mechanical recovery force is very low. However this implies problems of sticking, since capillary forces are very high, which thus also reduces the useful working life and reliability of these relays. The use of high activation voltages also has negative effects such as ionisation of the components, accelerated wearing due to strong mechanical solicitation and the electric noise which the relay generates.

Electrostatic relays also have a significant problem as to reliability, due to the phenomenon known as "pull-in", and which consists in that, once a given threshold has been passed, the contact electrode moves in increasing acceleration against the other free electrode. This is due to the fact that as the relay closes, the condenser which exerts the electrostatic force for closing, greatly increases its capacity (and would increase to infinity if a stop were not imposed beforehand). Consequently there is a significant wear on the electrodes due to the high electric field which is generated and the shock caused by the acceleration to which the moving electrode has been exposed.

Thermal, magnetic and piezoelectric approaches require special materials and micromachined processes, and thus integration in more complex MEMS devices, or in a same integrated with electronic circuitry is difficult and/or costly. Additionally the thermal approach is slow (which is to say that the circuit has a long opening or closing time) and uses a great deal of power. The magnetic approach generates electromagnetic noise, which renders having close electronic circuitry more difficult, and requires high peak currents for switching.

In this specification relay should be understood to be any device suitable for opening and closing at least one external electric circuit, in which at least one of the external electric circuit opening and closing actions is performed by means of an electromagnetic signal.

In the present description and claims the expression "contact point" has been used to refer to contact surfaces in which an electric contact is made (or can be made). In this respect they should not be understood as points in the geometric sense, since they are three-dimensional elements, but rather in the electric sense, as points in an electric circuit.

Preferably, the electromagnetic signal emitting and/or receiving device according to the invention comprises a miniaturised relay which, in turn, comprises:

a first zone facing a second zone, a first condenser plate, a second condenser plate arranged in the second zone, in which the second plate is smaller than or equal to the first plate, an intermediate space arranged between the first zone and the second zone, a conductive element arranged in the intermediate space, the conductive element being mechanically independent of the first zone and the second zone and being suitable for performing a movement across the intermediate space dependant on voltages present in the first and second condenser plates, a first contact point of an electric circuit, a second contact point of the electric circuit, in which the first and second contact point define first stops, in which the conductive element is suitable for entering into contact with the first stops and in which the conductive element closes the electric circuit when in contact with the first stops.

In fact in the relay according to the invention the conductive element, which is to say the element responsible for opening and closing the external electric circuit (across the first contact point and the second contact point), is a detached part capable of moving freely. I.e. the elastic force of the material is not being used to force one of the relay movements. This allows a plurality of different solutions, all benefiting from the advantage of needing very low activation voltages and allowing very small design sizes. The conductive element is housed in the intermediate space. The intermediate space is closed by the first and second zone and by lateral walls which prevent the conductive element from leaving the intermediate space. When voltage is applied to the first and second condenser plate charge distributions are induced in the conductive element which generates electrostatic forces which in turn move the conductive element in a direction along the intermediate space. By means of different designs to be described in detail below this effect can be used in several different ways.

Additionally, a relay according to the invention likewise satisfactorily resolves the previously mentioned problem of "pull-in".

Another additional advantage of the relay according to the invention is the following: in conventional electrostatic relays, if the conductive element sticks in a given position (which depends to a great extent, among other factors, on the humidity) there is no possible manner of unsticking it (except by external means, such as for example drying it) since due to the fact that the recovery force is elastic, is always the same (depending only on the position) and cannot be increased. On the contrary, if the conductive element sticks in a relay according to the invention, it will always be possible to unstick it by increasing the voltage.

The function of the geometry of the intermediate space and the positioning of the condenser plates can furnish several different types of relays, with as many applications and functioning methods.

For example, the movement of the conductive element can be as follows:

a first possibility is that the conductive element move along the intermediate space with a translation movement, i.e., in a substantially rectilinear manner (excluding of course possible shocks or oscillations and/or movements provoked by unplanned and undesired external forces) between the first and second zones.

a second possibility is that the conductive element have a substantially fixed end, around which can rotate the conductive element. The rotational axis can serve the function of contact point for the external electric circuit and the free end of the conductive element can move between the first and second zones and make, or not make, contact with the other contact point, depending on its position. As will be outlined below, this approach has a range of specific advantages.

Advantageously the first contact point is between the second zone and the conductive element. This allows a range of solutions to be obtained, discussed below.

A preferable embodiment is achieved when the first plate is in the second zone. Alternatively the relay can be designed so that the first plate is in the first zone. In the first case a relay is obtained which has a greater activation voltage and which is faster. On the other hand, in the second case the relay is slower, which means that the shocks experienced by the conductive element and the stops are smoother, and energy consumption is lower. One can obviously choose between one or the other alternatives depending on the specific requirements in each case.

A preferable embodiment of the invention is obtained when the second contact point is likewise in the second zone. In this case one will have a relay in which the conductive element performs the substantially rectilinear translation movement. When the conductive element is in contact with the first stops, which is to say with the first and second contact point of the electric circuit, the electric circuit is closed, and it is possible to open the electric circuit by means of different types of forces, detailed below. To again close the electric circuit, it is enough to apply voltage between the first and second condenser plates. This causes the conductive element to be attracted toward the second zone, again contacting the first and second contact point.

Should the first condenser plate be in the first zone and the second condenser plate in the second zone, a manner of achieving the necessary force to open the circuit cited in the above paragraph is by means of the addition of a third condenser plate arranged in the second zone, in which the third condenser plate is smaller than or equal to the first condenser plate, and in which the second and third condenser plates are, together, larger than the first condenser plate. With this arrangement the first condenser plate is to one side of the intermediate space and the second and third condenser plates are to the other side of the intermediate space and close to one another. In this manner one can force the movement of the conductive element in both directions by means of electrostatic forces and, in addition, one can guarantee the closing of the external electric circuit even though the conductor element remains at a voltage in principle unknown, which will be forced by the external circuit that is closed.

Another preferable embodiment of the invention is achieved when the relay additionally comprises a third condenser plate arranged in said second zone and a fourth condenser plate arranged in said first zone, in which said first condenser plate and said second condenser plate are equal to each other, and said third condenser plate and said fourth condenser plate are equal to one another. In fact, in this manner, if one wishes the conductive element to translate towards the second zone, one can apply voltage to the first and fourth condenser plates, on one side, and to the second or to the third condenser plates, on the other side. Given that the conductive element will move toward the place in which is located the smallest condenser plate, it will move toward the second zone. Likewise one can obtain movement of the conductive element toward the first zone by applying a voltage to the second and third condenser plates and to the first or the fourth condenser plates. The advantage of this solution, over the simpler three condenser plate solution, is that it is totally symmetrical, which is to say that it achieves exactly the same relay behaviour irrespective of whether the conductive element moves toward the second zone or the first zone. Advantageously the first, second, third and fourth condenser plates are all equal with respect to one another, since generally it is convenient that in its design the relay be symmetrical in several respects. On one hand there is symmetry between the first and second zone, as commented above. On the other hand it is necessary to retain other types of symmetry to avoid other problems, such as for example the problems of rotation or swinging in the conductive element and which will be commented upon below. In this respect it is particularly advantageous that the relay comprises, additionally, a fifth condenser plate arranged in the first zone and a sixth condenser plate arranged in the second zone, in which the fifth condenser plate and the sixth condenser plate are equal to each other. On one hand increasing the number of condenser plates has the advantage of better compensating manufacturing variations. On the other, the several different plates can be activated independently, both from the point of view of voltage applied as of activation time. The six condenser plates can all be equal to each other, or alternatively the three plates of a same side can have different sizes with respect to one another. This allows minimising activation voltages. A relay which has three or more condenser plates in each zone allows the following objectives to all be achieved:

- it can function in both directions symmetrically,
- it has a design which allows a minimum activation voltage for fixed overall relay dimensions, since by having two plates active in one zone and one plate active in the other zone distinct surface areas can always be provided,
- it allows minimisation of current and power consumption, and also a smoother relay functioning,
- it can guarantee the opening and closing of the relay, independently of the voltage emitted by the external electric circuit to the conductive element when they enter in contact,
- in particular if the relay has six condenser plates in each zone, it can in addition comply with the requirement of central symmetry which, as we shall see below, is another significant advantage. Therefore another preferable embodiment of the invention is obtained when the relay comprises six condenser plates arranged in the first zone and six condenser plates arranged in the second zone. However it is not absolutely necessary to have six condenser plates in each zone to achieve central symmetry: it is possible to achieve it as well, for example, with three condenser plates in each zone, although in this case one must forego minimising current and power consumption and optimising the "smooth" functioning of the relay. In general, increasing the number of condenser plates in each zone allows greater flexibility and versatility in the design, whilst it allows a reduction of the variations inherent in manufacture, since the manufacturing variations of each of the plates will tend to be compensated by the variations of the remaining plates.

However it should not be discounted that in certain cases it can be interesting to deliberately provoke the existence of force moments in order to force the conductive element to perform some kind of revolution additional to the translation movement. It could be advantageous, for example, to overcome possible sticking or friction of the conductive element with respect to the fixed walls.

Advantageously the relay comprises a second stop (or as many second stops as there are first stops) between the first zone and the conductive element. In this manner one also achieves a geometric symmetry between the first zone and the second zone. When the conductive element moves toward the second zone, it can do so until entering into contact with the first stops, and will close the external electric circuit. When the conductive element moves toward the first zone it can do so until entering into contact with the second stop(s). In this manner the movement performed by the conductive element is symmetrical.

Another preferable embodiment of the invention is achieved when the relay comprises a third contact point arranged between the first zone and the conductive element, in which the third contact point defines a second stop, such that the conductive element closes a second electric circuit when in contact with the second contact point and third contact point. In this case the relay acts as a commuter, alternately connecting the second contact point with the first contact point and with the third contact point.

A particularly advantageous embodiment of the previous example is achieved when the conductive element comprises a hollow cylindrical part which defines a axis, in the interior of which is housed the second contact point, and a flat part which protrudes from one side of the radially hollow cylindrical part and which extends in the direction of the axis, in which the flat part has a height, measured in the direction of the axis, which is less than the height of the cylindrical part, measured in the direction of the axis. This specific case complies simultaneously with the circumstance that the conductive element perform a rotational movement around one of its ends (cf. the "second possibility" cited above). Additionally, the cylindrical part is that which rests on bearing surfaces (one at each end of the cylinder, and which extends between the first zone and the second zone) whilst the flat part is cantilevered with respect to the cylindrical part, since it has a lesser height. Thus the flat part is not in contact with walls or fixed surfaces (except the first and third contact point) and, in this manner, the sticking and frictional forces are lessened. As to the second point of contact, it is housed in the internal part of the cylindrical part, and serves as rotational axis as well as second contact point. Thus an electric connection is established between the first and second contact points or between the third and second contact points. The hollow cylindrical part defines a cylindrical hollow, which in all cases has a surface curved to the second contact point, thus reducing the risks of sticking and frictional forces.

Another particularly advantageous embodiment of the previous example is obtained when the conductive element comprises a hollow parallelepipedic part which defines a axis, in the interior of which is housed the second contact point, and a flat part which protrudes from one side of the radially hollow parallelepipedic part and which extends in the direction of the axis, in which the flat part has a height, measured in the direction of the axis, which is less than the height of the parallelepipedic part, measured in the direction of the axis. In fact, it is an embodiment similar to that above, in which the parallelepipedic part defines a parallelepipedic hollow. This solution can be particularly advantageous in the case of very small embodiments, since in this case the resolution capacity of the manufacturing process (in particular in the case of the photolithographic procedures) obliges the use of straight lines. In both cases it should be emphasised that the determining geometry is the geometry of the interior hollow and that, in fact, several different combinations are possible:

- axis (second contact point) having a rectangular section and hollow with rectangular section,
- axis having a circular section and hollow having a circular section,
- axis having a circular section and hollow having a rectangular section and vice versa, although the first two combinations are the most advantageous.

Logically, should the sections be rectangular, there should be enough play between the axis and the parallelepipedic part such that the conductive element can rotate around the axis. Likewise in the case of circular sections there can be a significant amount of play between the axis and the cylindrical part, such that the real movement performed by the conductive element is a combination of rotation around the axis and translation between the first and second zone. It should be noted, additionally, that it is also possible that the second stop not be connected electrically to any electric circuit: in this case a relay will be obtained which can open and close only one electric circuit, but in which the conductive element moves by means of a rotation (or by means of a rotation combined with translation).

Another preferable embodiment of the invention is obtained when the relay comprises a third and a fourth contact points arranged between the first zone and the conductive element, in which the third and fourth contact points define second stops, such that the conductive element closes a second electric circuit when in contact with the third and fourth contact points. In fact, in this case the relay can alternatively connect two electric circuits.

Advantageously each of the assemblies of condenser plates arranged in each of the first zone and second zone is centrally symmetrical with respect to a centre of symmetry, in which said centre of symmetry is superposed to the centre of masses of the conductive element. In fact, each assembly of the condenser plates arranged in each of the zones generates a field of forces on the conductive element. If the force resulting from this field of forces has a non nil moment with respect to the centre of masses of the conductive element, the conductive element will not only undergo translation but will also undergo rotation around its centre of masses. In this respect it is suitable to provide that the assemblies of plates of each zone have central symmetry in the case that this rotation is not advantageous, or on the other hand it could be convenient to provide central asymmetry should it be advantageous to induce rotation in the conductive element with respect to its centre of masses, for example to overcome frictional forces and/or sticking.

As already indicated, the conductive element is usually physically enclosed in the intermediate space, between the first zone, the second zone and lateral walls. Advantageously between the lateral walls and the conductive element there is play sufficiently small such as to geometrically prevent the conductive element entering into contact simultaneously with a contact point of the group formed by the first and second contact points and with a contact point of the group formed by the third and fourth contact points. That is to say, the conductive element is prevented from adopting a transversal position in the intermediate space in which it connects the first electric circuit to the second electric circuit.

To avoid sticking and high frictional forces it is advantageous that the conductive element has rounded external surfaces, preferably that it be cylindrical or spherical. The spherical solution minimises the frictional forces and sticking in all directions, whilst the cylindrical solution, with the bases of the cylinder facing the first and second zone allow reduced frictional forces to be achieved with respect to the lateral walls whilst having large surfaces facing the condenser plates—efficient as concerns generation of electrostatic forces. This second solution also has larger contact surfaces with the contact points, diminishing the electric resistance which is introduced in the commuted electric circuit.

Likewise, should the conductive element have an upper face and a lower face, which are perpendicular to the movement of the conductive element, and at least one lateral face, it is advantageous that the lateral face has slight protuberances. These protuberances will further allow reduction of sticking and frictional forces between the lateral face and the lateral walls of the intermediate space.

Advantageously the conductive element is hollow. This allows reduced mass and thus achieves lower inertia.

Should the relay have two condenser plates (the first plate and the second plate) and both in the second zone, it is advantageous that the first condenser plate and the second condenser plate have the same surface area, since in this manner the minimal activation voltage is obtained for a same total device surface area.

Should the relay have two condenser plates (the first plate and the second plate) and the first plate is in the first zone whilst the second plate is in the second zone, it is advantageous that the first condenser plate has a surface area that is equal to double the surface area of the second condenser plate, since in this manner the minimal activation voltage is obtained for a same total device surface area.

Another preferable embodiment of a relay according to the invention is obtained when one of the condenser plates simultaneously serves as condenser plate and as contact point (and thus of stop). This arrangement will allow connection of the other contact point (that of the external electric circuit) at a fixed voltage (normally VCC or GND) or leaving it at high impedance.

As it can be observed below, the preferable embodiments of relays according to the invention shown in FIGS. 7 to 23 comprise a combination of different alternatives and options above explained, although an expert in the art will be able to observe that they are alternatives and options that can be mutually combined in different ways. Any of these relays can be incorporated in an electromagnetic signal emitting and/or receiving device as the above described.

Figure 7:
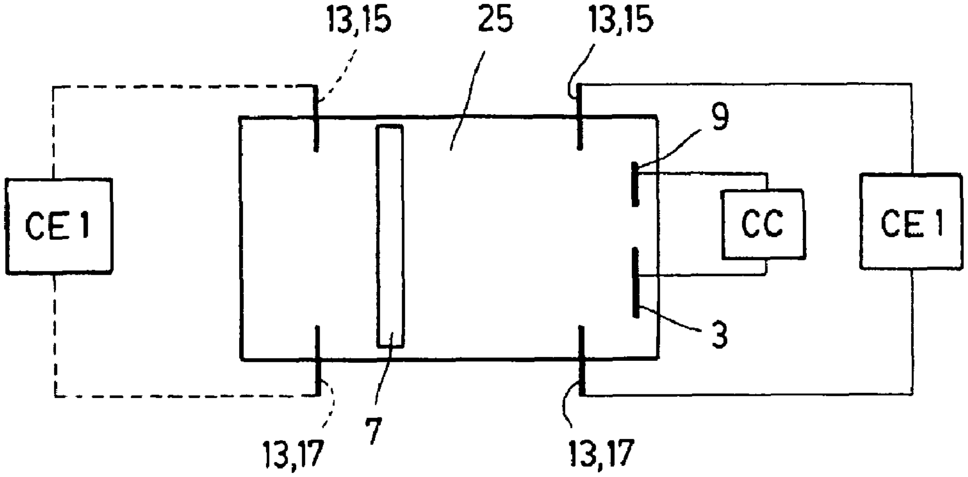
FIG. 7, a simplified diagram of a relay with two condenser plates in the second zone thereof.

FIG. 7 shows a first basic functioning mode of a relay according to the invention. The relay defines an intermediate space 25 in which is housed a conductive element 7, which can move freely along the intermediate space 25, since physically it is a detached part which is not physically joined to the walls which define the intermediate space 25. The relay also defines a first zone, on the left in FIG. 7, and a second zone, on the right in FIG. 1. In the second zone are arranged a first condenser plate 3 and a second condenser plate 9. In the example shown in FIG. 7 both condenser plates 3 and 9 have different surface areas, although they can be equal with respect to one another. The first condenser plate 3 and the second condenser plate 9 are connected to a control circuit CC. Applying a voltage between the first condenser plate 3 and the second condenser plate 9, the conductive element is always attracted towards the right in FIG. 7, towards the condenser plates 3 and 9. The conductive element 7 will be moved towards the right until being stopped by first stops 13, which are a first contact point 15 and a second contact point 17 of a first external electric circuit CE1, such that the first external electric circuit CE1 is closed.

Figure 8:
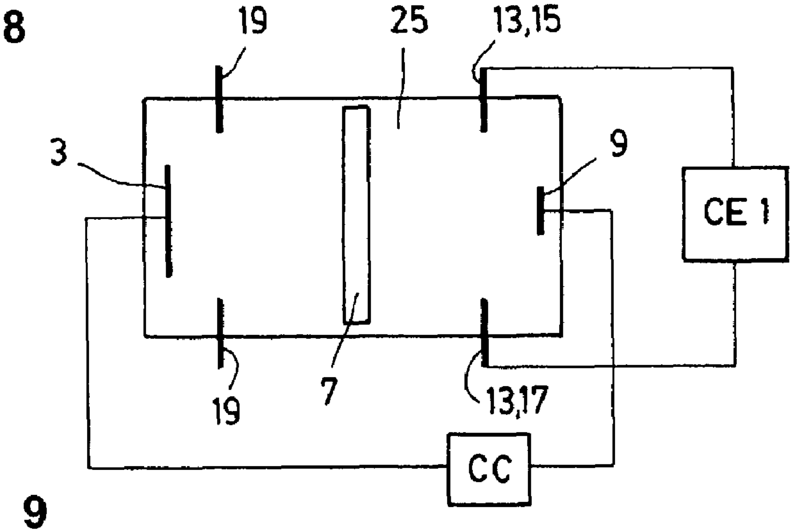
FIG. 8, a simplified diagram of a relay with two condenser plates, one in each of the zones thereof.

FIG. 8 shows a second basic functioning mode for a relay according to the invention. The relay again defines an intermediate space 25 in which is housed a conductive element 7, which can move freely along the intermediate space 25, a first zone, on the left in FIG. 8, and a second zone, on the right in FIG. 8. In the second zone is arranged a second condenser plate 9 whilst in the first zone is arranged a first condenser plate 3. The first condenser plate 3 and the second condenser plate 9 are connected to a control circuit CC. Applying a voltage between the first condenser plate 3 and the second condenser plate 9, the conductive element is always attracted to the right of the FIG. 8, towards the smallest condenser plate, i.e. towards the second condenser plate 9. For this reason, the fact that in the example shown in FIG. 8 both condenser plates 3 and 9 have different surface areas is, in this case, absolutely necessary, since if they were to have equal surface areas, the conductive element 7 would not move in any direction. The conductive element 7 will move towards the right until being stopped by first stops 13, which are a first contact point 15 and a second contact point 17 of a first external electric circuit CE1, such that the first external electric circuit CE1 is closed. On the left there are second stops 19 which in this case do not serve any electric function but which stop the conductive element 7 from entering into contact with the first condenser plate 3. In this case the stops 19 can be removed, since no problem is posed by the conductive element 7 entering into contact with the first condenser plate 3. This is because there is only one condenser plate on this side, if there had been more than one and if they had been connected to different voltages then the stops would have been necessary to avoid a short-circuit.

The configurations of relays of FIGS. 7 and 8 are suitable, for example, for being used as sensors, in which the magnitude to be measured exercises a force which is that which will be counteracted by the electrostatic force induced in the conductive element 7. Such as represented, in both cases the magnitude to be measured must exercise a force tending to open the electric circuit CE1, whilst the electrostatic force will tend to close it. However, a relay can be designed to work exactly in the opposite respect: such that the magnitude to be measured would tend to close the electric circuit CE1 whilst the electrostatic force would tend to open it. In this case, the first stops 13 would need to be positioned on the left in FIGS. 7 and 8, together with the corresponding electric circuit CE1. In FIG. 7 this possibility has been shown in a broken line. If the stops are placed on both sides then the sensor can detect magnitude in both directions, although the algorithm would have to change, from tending to close to tending to open, when a change in direction is detected as having occurred, as would happen when not obtaining closing/opening with the minimum voltage, which is zero. It should be recalled that the sign of the voltage applied does not effect the direction of movement of the conductive element 7. Other possibility could be to use the centrifugal force of a rotational movement (for example the centrifugal force of the rotational movement of the antenna) to open or close the electric circuit CE1.

Figure 9:
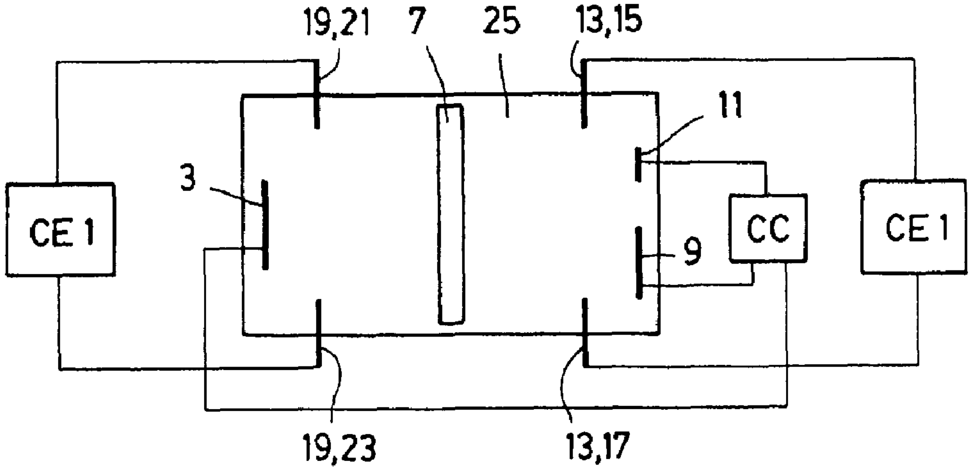
FIG. 9, a simplified diagram of a relay with three condenser plates.

To achieve moving the conductive element 7 in both directions by means of electrostatic forces, it is necessary to provide a third condenser plate 11, as shown in FIG. 9. Given that the conductive element 7 will always move towards where the smallest condenser plate is located, it is necessary, in this case, that the third condenser plate 11 be smaller than the first condenser plate 3, but that the sum of the surface areas of the second condenser plate 9 and the third condenser plate 11 be larger than the first condenser plate 3. In this manner, activating the first condenser plate 3 and the second condenser plate 9, connecting them to different voltages, but not the third condenser plate 11, which will remain in a state of high impedance, the conductive element 7 can be moved to the right, whilst activating the three condenser plates 3, 9 and 11 the conductor element 7 can be moved to the left. In the latter case the second condenser plate 9 and the third condenser plate 11 are supplied at a same voltage, and the first condenser plate 3 at a different voltage. The relay of FIG. 9 has, in addition, a second external electric circuit CE2 connected to the second stops 19, in a manner that these second stops 19 define a third contact point 21 and a fourth contact point 23.

Should two condenser plates be provided in each of the first and second zones, the movement of the conductive element 7 can be solicited in two different ways:

- applying a voltage between the two condenser plates of a same zone, so that the conductive element is attracted by them (functioning as in FIG. 7)
- applying a voltage between one condenser plate of one zone and a (or both) condenser plate(s) of the other zone, such that the conductive element 7 is attracted towards the zone in which the electrically charged condenser surface area is smallest (functioning as in FIG. 8).

Figure 10:
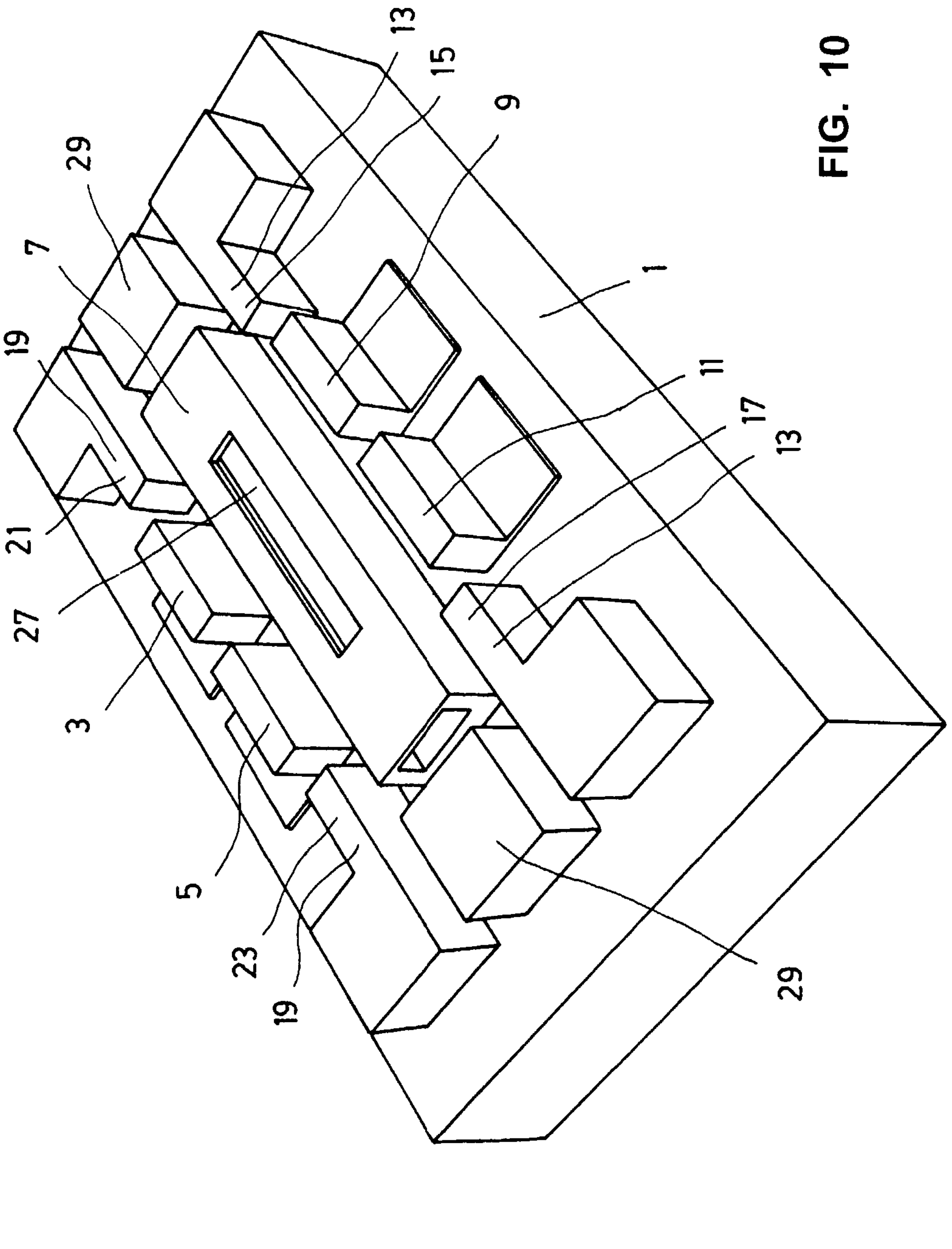
FIG. 10, a perspective view of a first embodiment of a relay according to the invention, uncovered.
Figure 11:
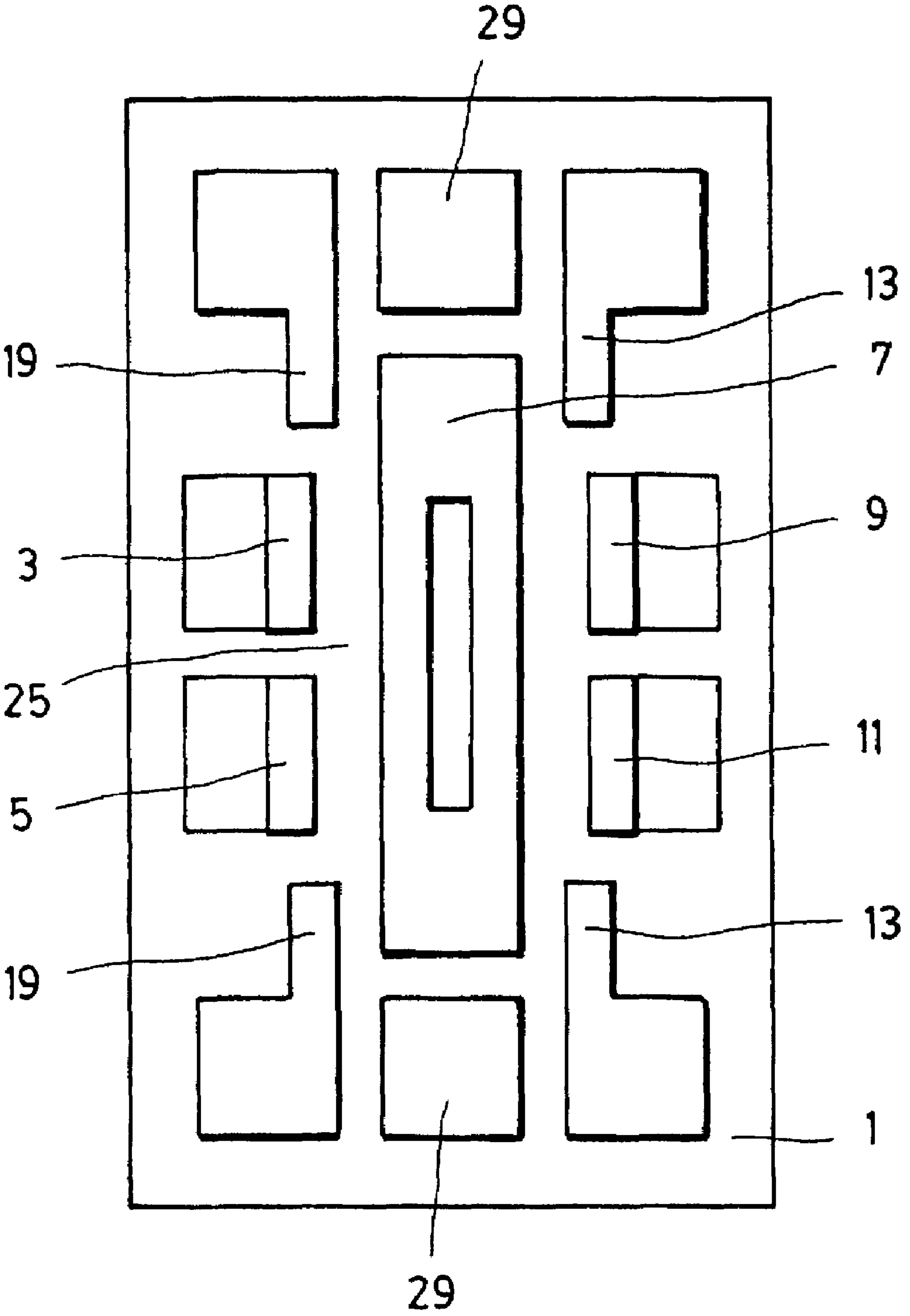
FIG. 11, a plan view of the relay of FIG. 10.

FIGS. 10 and 11 illustrate a relay designed to be manufactured with EFAB technology. This micromechanism manufacturing technology by means of layer depositing is known by persons skilled in the art, and allows the production of several layers and presents a great deal of versatility in the design of three-dimensional structures. The relay is mounted on a substrate 1 which serves as support, and which in several of the appended drawings has not been illustrated in the interest of simplicity. The relay has a first condenser plate 3 and a fourth condenser plate 5 arranged on the left (according to FIG. 11) of a conductive element 7, and a second condenser plate 9 and a third condenser plate 11 arranged on the right of the conductive element 7. The relay also has two first stops 13 which are the first contact point 15 and the second contact point 17, and two second stops 19 which are the third contact point 21 and the fourth contact point 23. The relay is covered in its upper part, although this cover has not been shown in order to be able to clearly note the interior details.

The relay goes from left to right, and vice versa, according to FIG. 11, along the intermediate space 25. As can be observed the first stops 13 and the second stops 19 are closer to the conductive element 7 than the condenser plates 3, 5, 9 and 11. In this manner the conductive element 7 can move from left to right, closing the corresponding electric circuits, without interfering with the condenser plates 3, 5, 9 and 11, and their corresponding control circuits.

The conductive element 7 has a hollow internal space 27.

There is play between the conductive element 7 and the walls which form the intermediate space 25 (which is to say the first stops 13, the second stops 19, the condenser plates 3, 5, 9 and 11 and the two lateral walls 29) which is sufficiently small to prevent the conductive element 7 from spinning along an axis perpendicular to the plane of the drawing of FIG. 11 enough to contact the first contact point 15 with the third contact point 21 or the second contact point 17 with the fourth contact point 23. In the figures, however, the play is not drawn to scale, so as to allow greater clarity in the figures.

Figure 12:
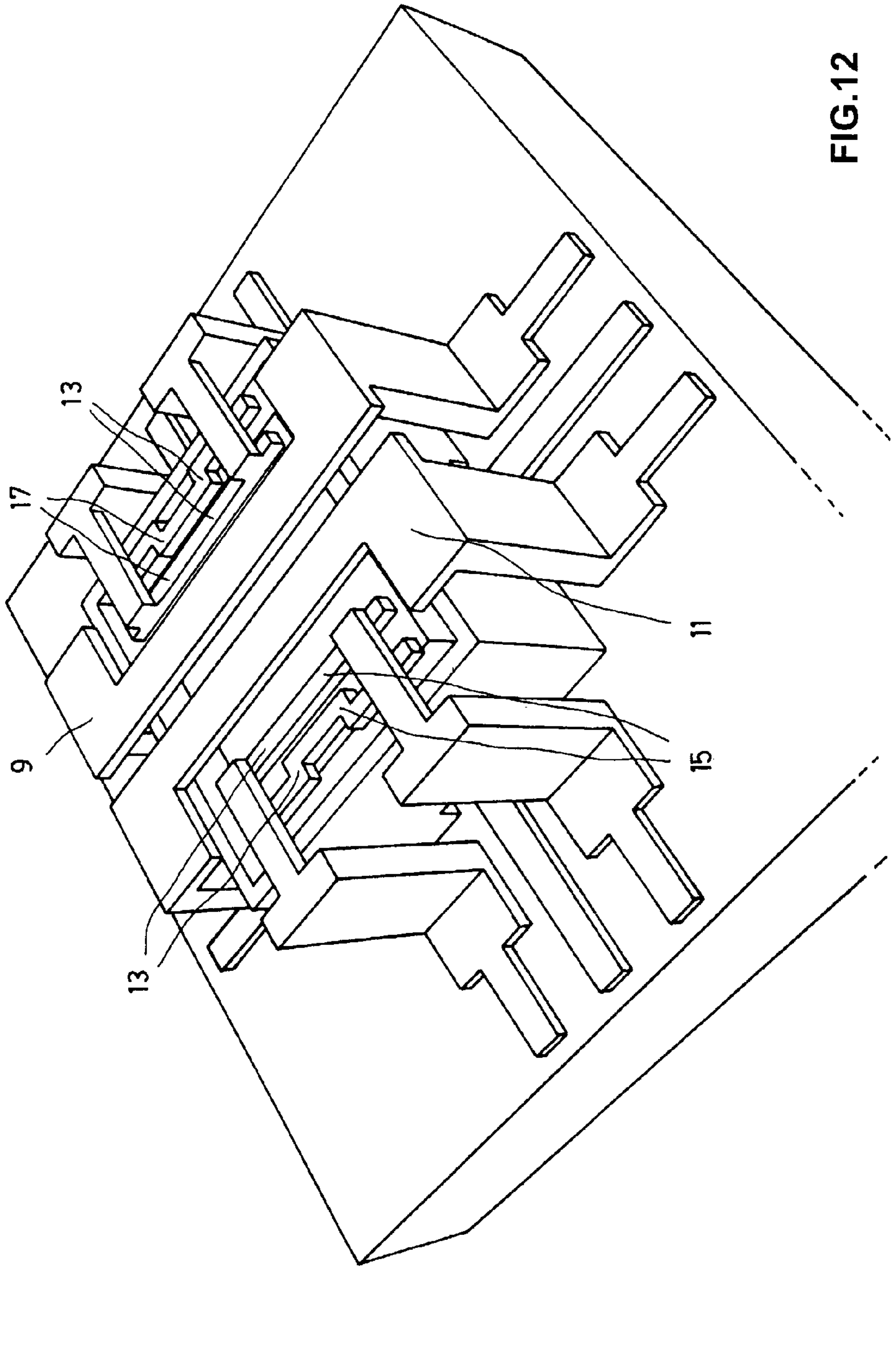
FIG. 12, a perspective view of a second embodiment of a relay according to the invention.
Figure 13:
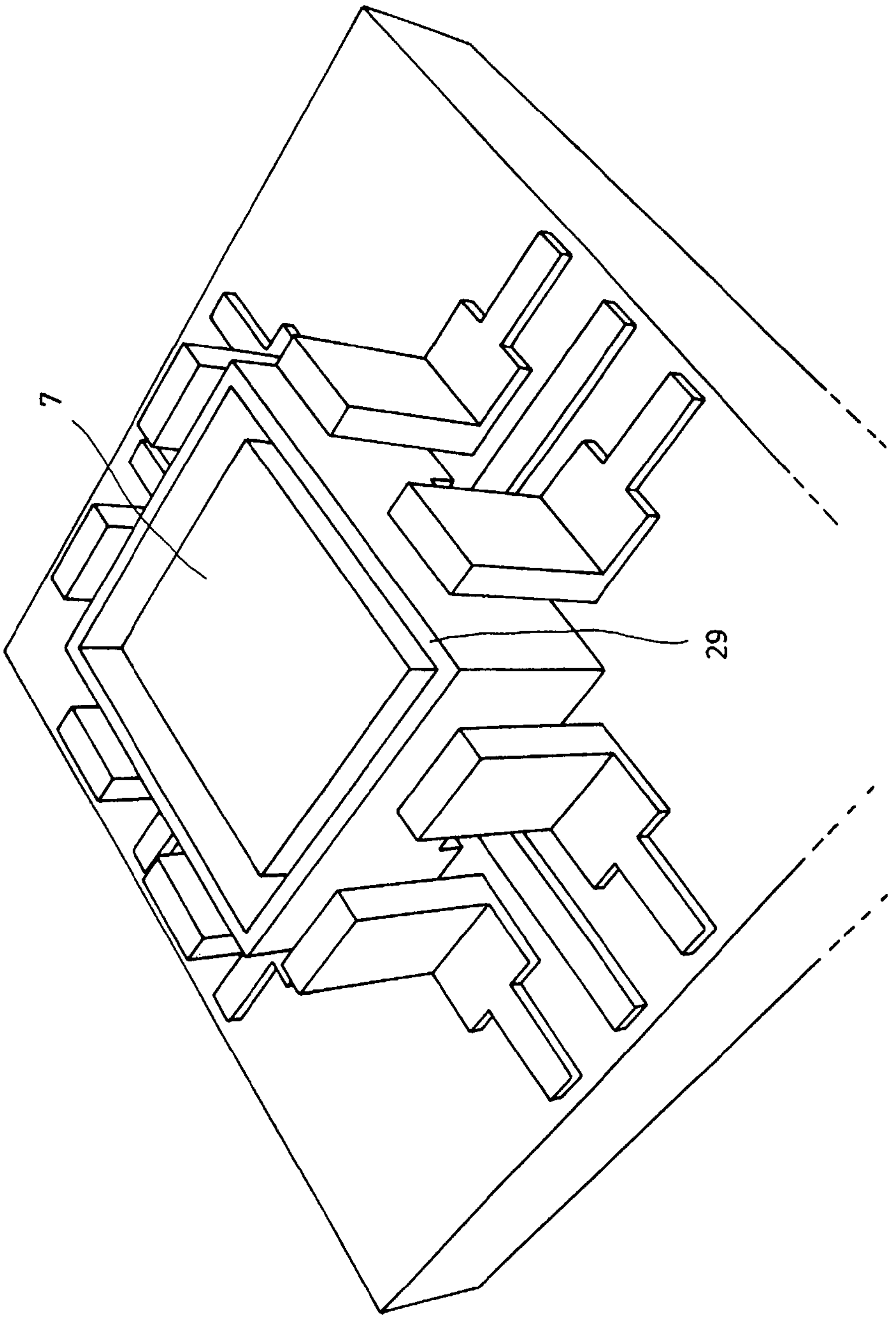
FIG. 13, a perspective view of the relay of FIG. 12 from which the components of the upper end have been removed.
Figure 14:
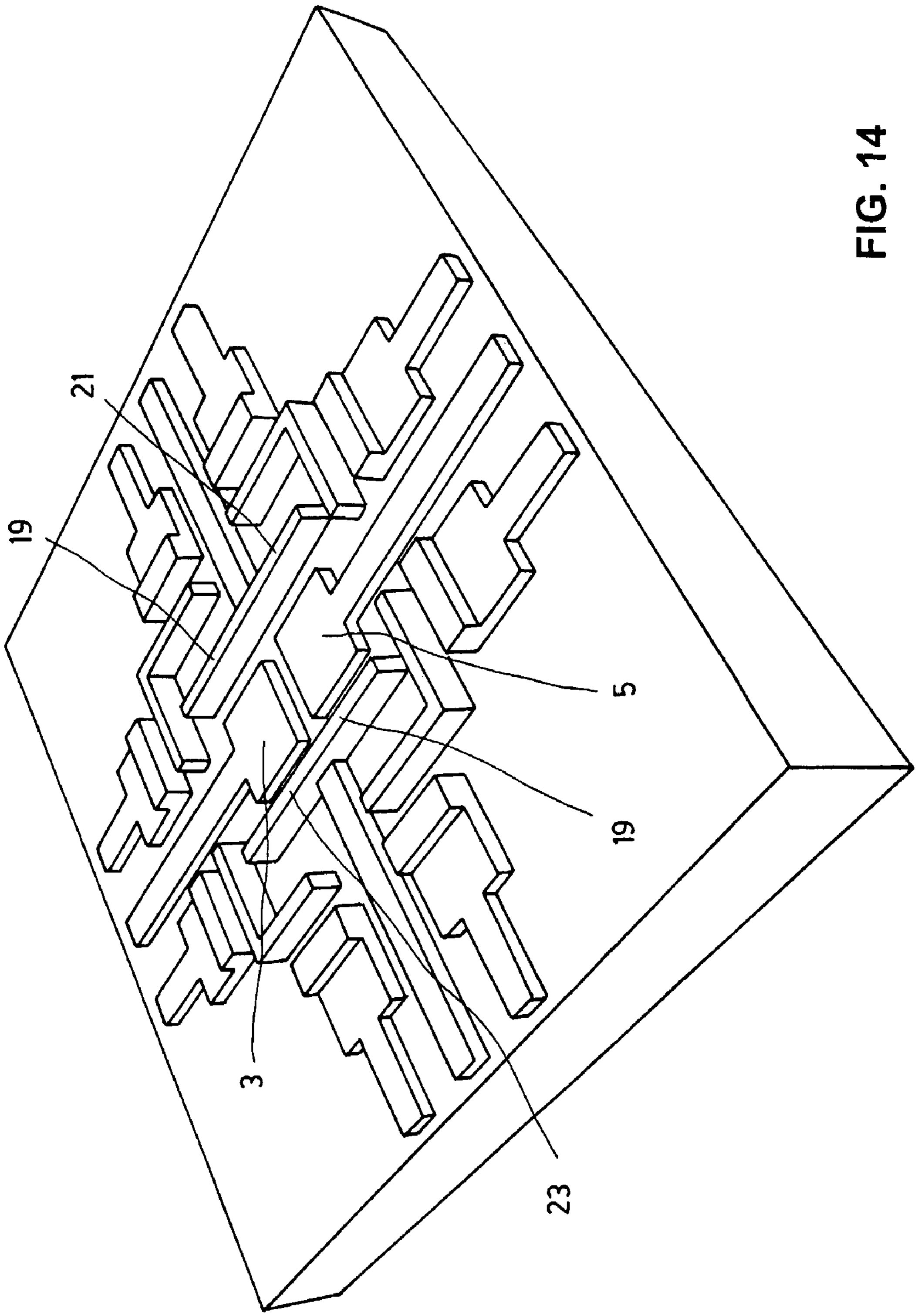
FIG. 14, a perspective view of the lower elements of the relay of FIG. 12.

FIGS. 12 to 14 show another relay designed to be manufactured with EFAB technology. In this case the conductive element 7 moves vertically, in accordance with FIGS. 12 to 14. The use of one or the other movement alternative in the relay depends on design criteria. The manufacturing technology consists in the deposit of several layers. In all figures the vertical dimensions are exaggerated, which is to say that the physical devices are much flatter than as shown in the figures. Should one wish to obtain larger condenser surfaces it would be preferable to construct the relay with a form similar to that shown in the FIGS. 12 to 14 (vertical relay), whilst a relay with a form similar to that shown in FIGS. 10 and 11 (horizontal relay) would be more appropriate should a lesser number of layers be desired. Should certain specific technologies be used (such as those usually known as polyMUMPS, Dalsa, SUMMIT, Tronic's, Qinetiq's, etc) the number of layers will always be limited. The advantage of a vertical relay is that larger surfaces are obtained with a smaller chip area, and this implies much lower activation voltages (using the same chip area).

Conceptually the relay of FIGS. 12 to 14 is very similar to the relay of FIGS. 10 and 11, and has the first condenser plate 3 and the fourth condenser plate 5 arranged in the lower part (FIG. 14) as well as the second stops 19 which are the third contact point 21 and the fourth contact point 23. As can be seen in the drawings the second stops 19 are above the condenser plates, such that the conductive element 7 can bear on the second stops 19 without entering into contact with the first and fourth condenser plates 3, 5. In the upper end (FIG. 12) is the second condenser plate 9, the third condenser plate 11 and two first stops 13 which are the first contact point 15 and the second contact point 17. In this case the play between the conductive element 7 and the lateral walls 29 is also sufficiently small to avoid the first contact point 15 contacting with the third contact point 21 or the second contact point 17 contacting with the fourth contact point 23.

Figure 15:
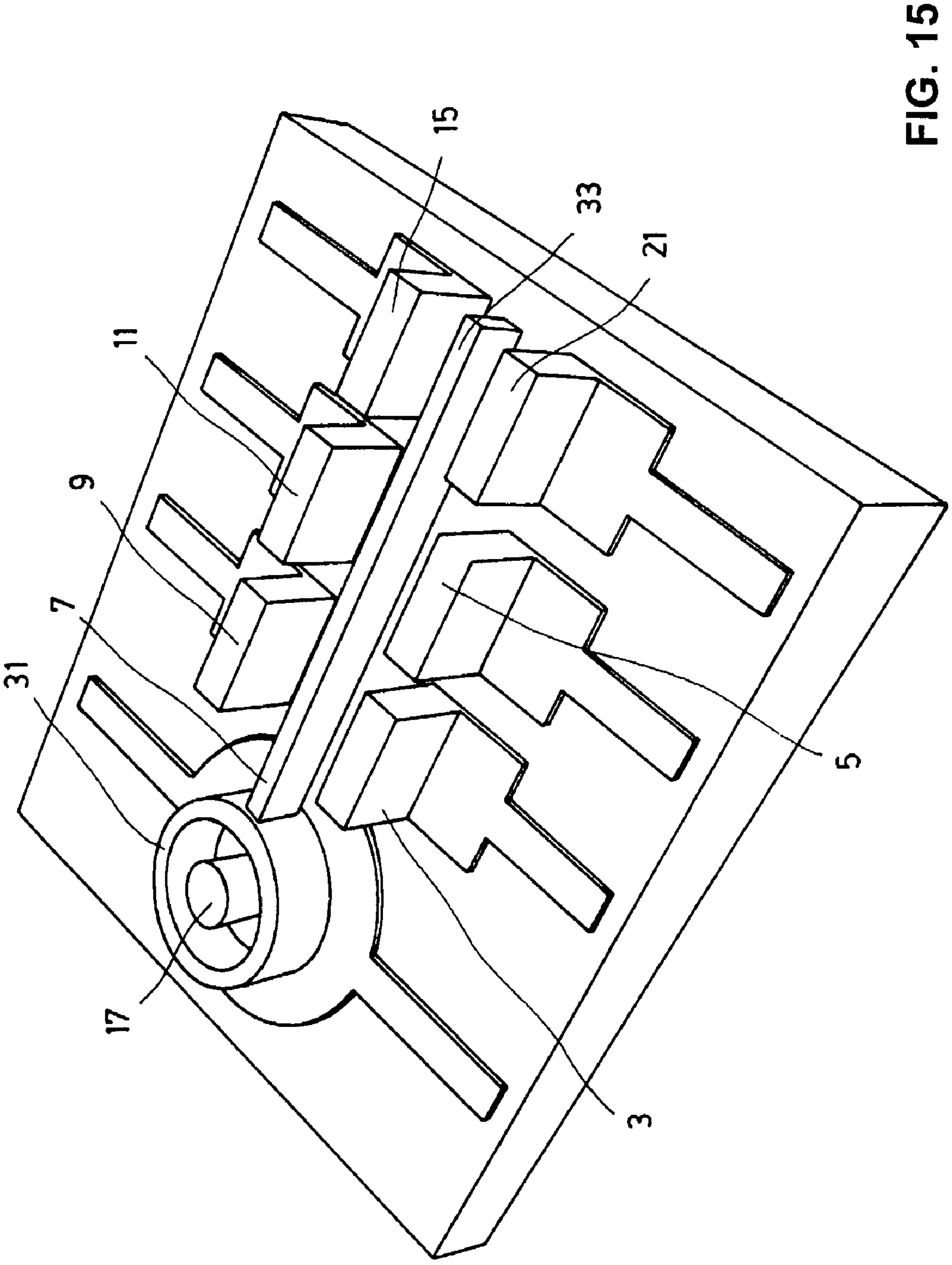
FIG. 15, a perspective view of a third embodiment of a relay according to the invention, uncovered.
Figure 16:
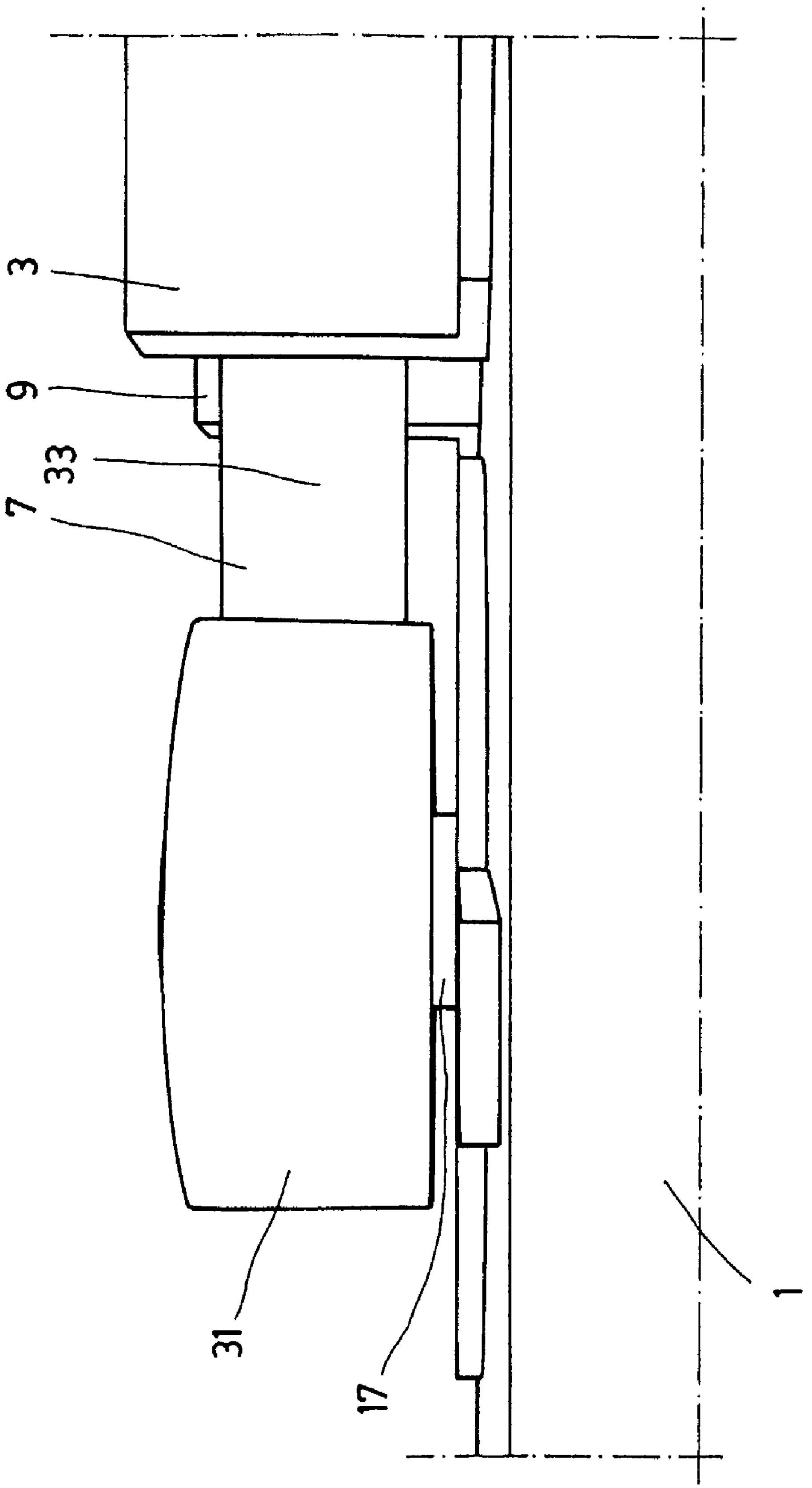
FIG. 16, a perspective view, in detail, of the cylindrical part of the relay of FIG. 15.

The relay shown in FIGS. 15 and 16 is an example of a relay in which the movement of the conductive element 7 is substantially a rotation around one of its ends. This relay has a first condenser plate 3, a second condenser plate 9, a third condenser plate 11 and a fourth condenser plate 5, all mounted on a substrate 1. Additionally there is a first contact point 15 and a third contact point 21 facing each other. The distance between the first contact point 15 and the third contact point 21 is less than the distance between the condenser plates. The conductive element 7 has a cylindrical part 31 which is hollow, in which the hollow is likewise cylindrical. In the interior of the cylindrical hollow is housed a second contact point 17, having a cylindrical section.

In this manner the conductive element 7 will establish an electrical contact between the first contact point 15 and the second contact point 17 or the third contact point 21 and the second contact point 17. The movement performed by the conductive element 7 is substantially a rotation around the axis defined by the cylindrical part 31. The play between the second contact point 17 and the cylindrical part 31 is exaggerated in the FIG. 15, however it is certain that a certain amount of play exists, the movement performed by the conductive element 7 thus not being a pure rotation but really a combination of rotation and translation.

From the cylindrical part 31 extends a flat part 33 which has a lesser height than the cylindrical part 31, measured in the direction of the axis of said cylindrical part 31. This can be observed in greater detail in FIG. 10, in which is shown a view almost in profile of the cylindrical part 31 and the flat part 33. In this manner one avoids the flat part 33 entering into contact with the substrate 1, which reduces the frictional forces and sticking.

As can be seen, substituting a parallelepipedic part for the cylindrical part 31 and replacing the second contact point 17 having a circular section by one having a quadrangular section, as long as play is sufficient, one can design a relay which is conceptually equivalent to that of FIGS. 15 and 16.

If, for example, in the relay shown in FIGS. 15 and 16 the first contact point 15 and/or the third contact point 21 were eliminated, then it would be the very condenser plates (specifically the third condenser plate 11 and the fourth condenser plate 5) which would serve as contact points and stops. By means of a suitable choice of voltages at which the condenser plates must work one can obtain that this voltage be always VCC or GND. Another possibility would be, for example, that the third contact point 21 were not electrically connected to any external circuit. Then the third contact point would only be a stop, and when the conductive element 7 contacts the second contact point 17 with the third contact point 21, the second contact point 17 would be in a state of high impedance in the circuit.

Figure 17:
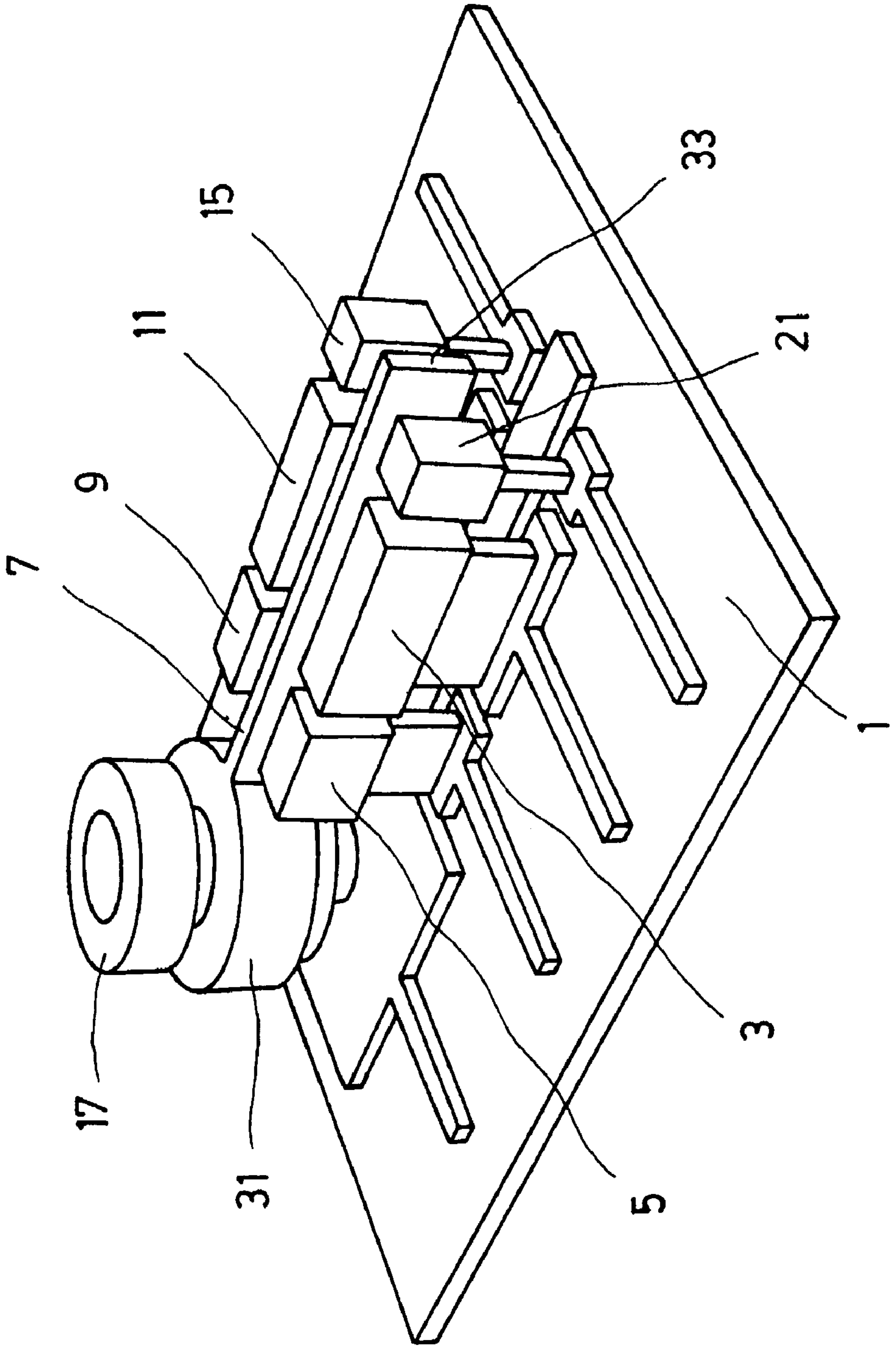
FIG. 17, a perspective view of a fourth embodiment of a relay according to the invention.

The relay shown in FIG. 17, is designed to be manufactured with polyMUMPS technology. As already mentioned, this technology is known by a person skilled in the art, and is characterised by being a surface micromachining with three structural layers and two sacrificial layers. However, conceptually it is similar to the relay shown in FIGS. 15 and 16, although there are some differences. Thus in the relay of FIG. 17 the first condenser plate 3 is equal to the third condenser plate 11, but is different from the second condenser plate 9 and the fourth condenser plate 5, which are equal to each other and smaller than the former. With respect to the second contact point 17 it has a widening at its upper end which permits retaining the conductive element 7 in the intermediate space 25. The second contact point 17 of FIGS. 15 and 16 also can be provided with this kind of widening. It is also worth noting that in this relay the distance between the first contact point 15 and the third contact point 21 is equal to the distance between the condenser plates. Given that the movement of the conductive element 7 is, mainly, a rotational movement around the second contact point 17, the opposite end of the conductive element describes an arc such that it contacts with first or third contact point 15, 21 before the flat part 33 can touch the condenser plates.

Figure 18:
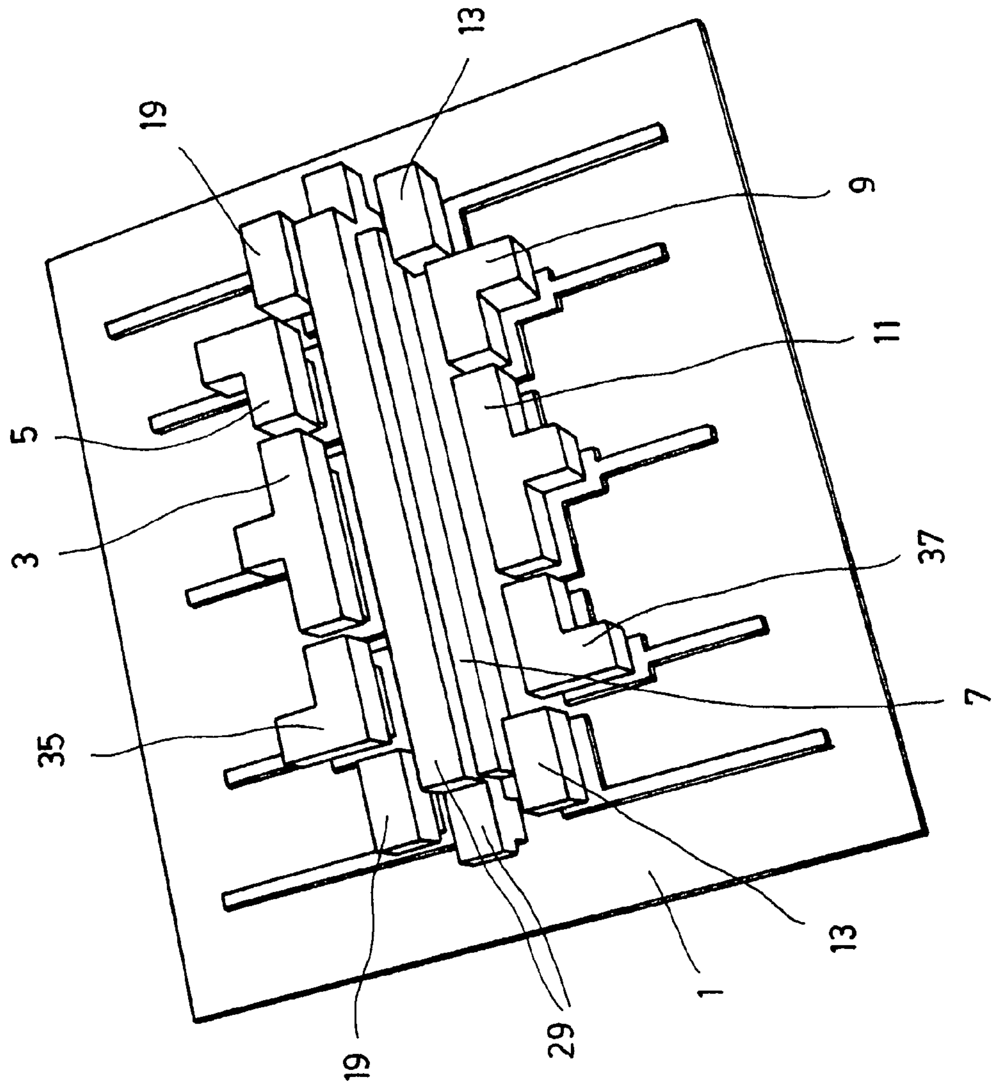
FIG. 18, a perspective view of a fifth embodiment of a relay according to the invention.

FIG. 18 shows another relay designed to be manufactured with polyMUMPS technology. This relay is similar to the relay of FIGS. 10 and 11, although it has, additionally, a fifth condenser plate 35 and a sixth condenser plate 37.

Figure 19:
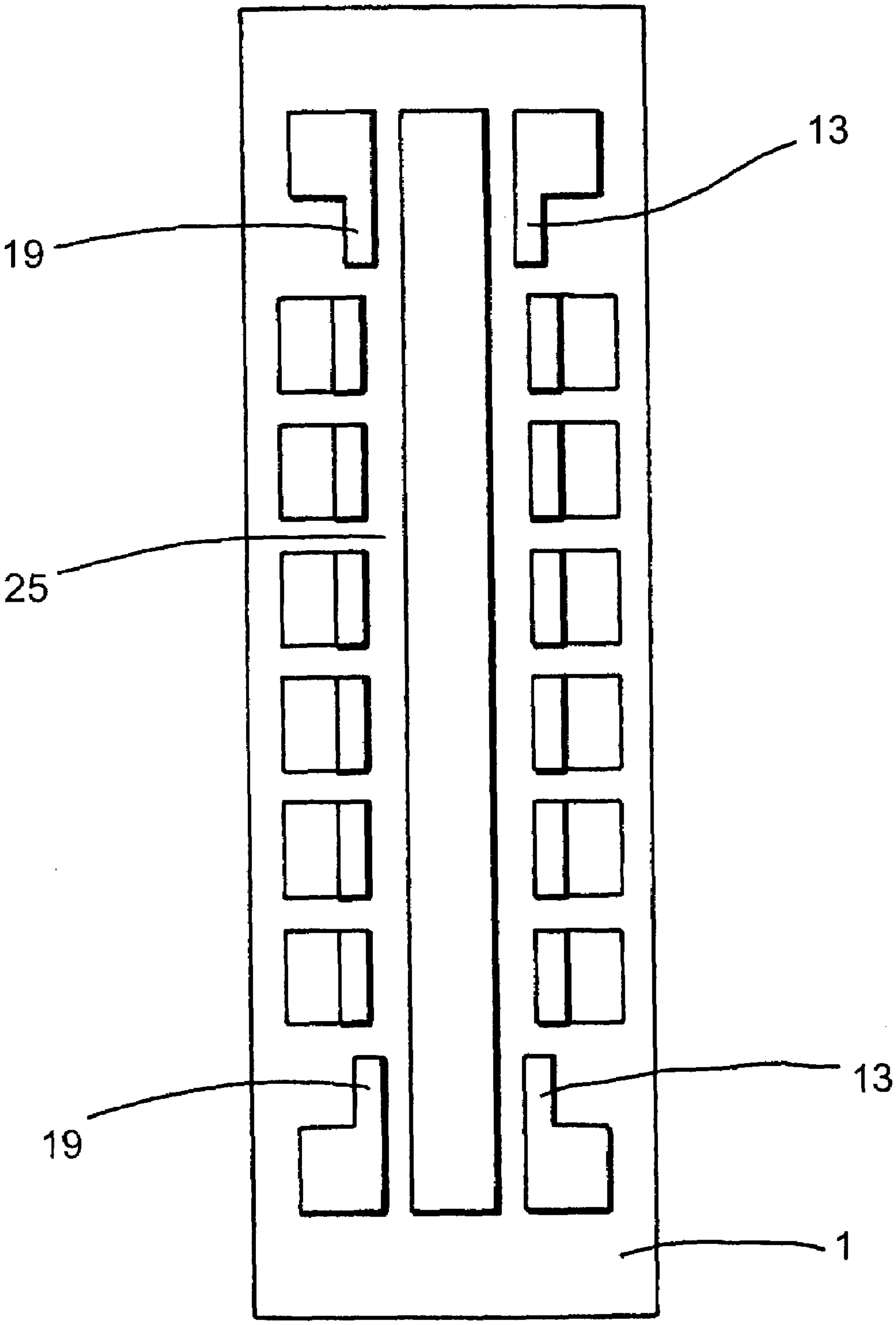
FIG. 19, a plan view of a sixth embodiment of a relay according to the invention.

FIG. 19 illustrates a relay equivalent to that shown in FIGS. 10 and 11, but which has six condenser plates in the first zone and six condenser plates in the second zone. Additionally, one should note the upper cover which avoids exit of the conductive element 7.

Figure 20:
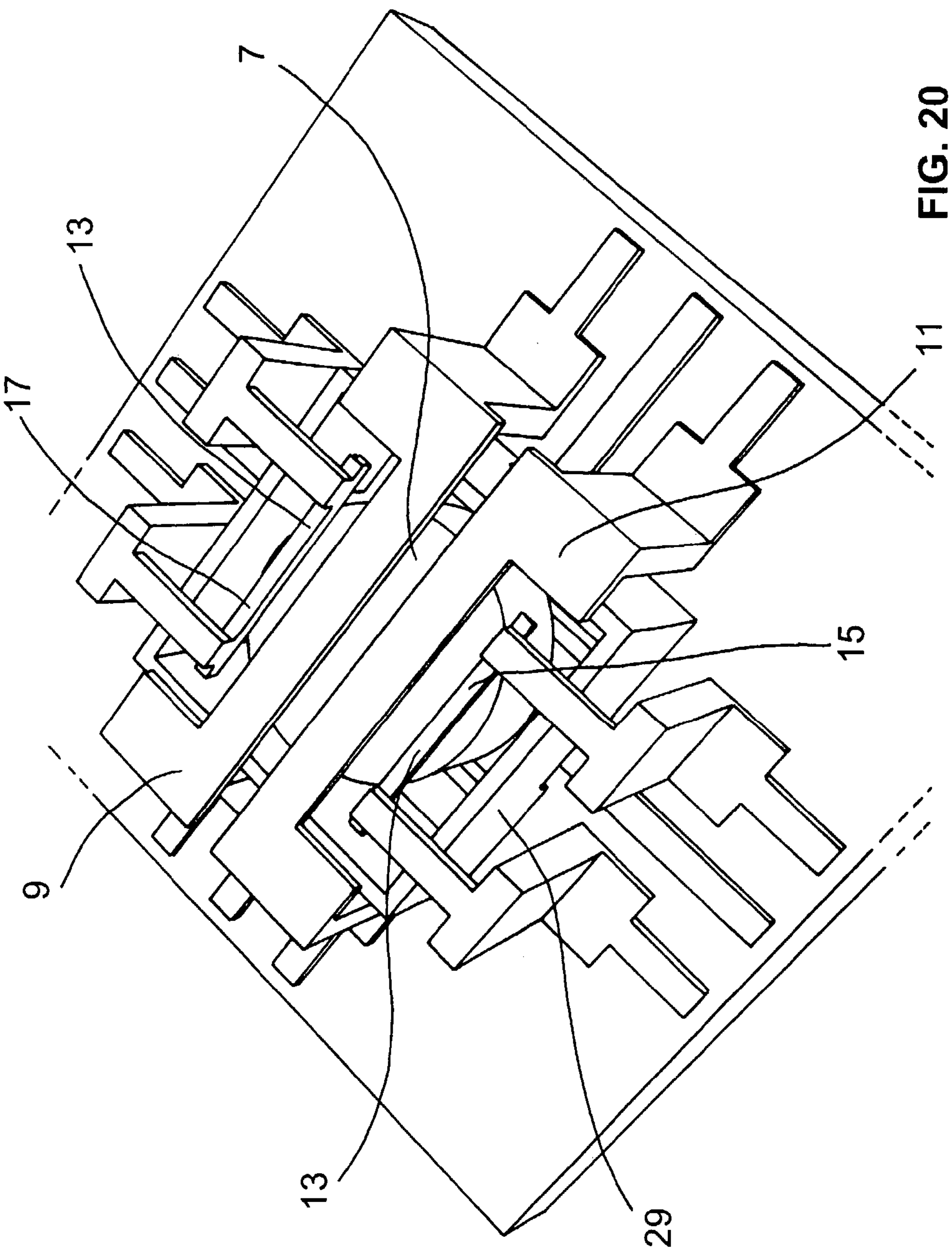
FIG. 20, a perspective view of a seventh embodiment of a relay according to the invention.
Figure 21:
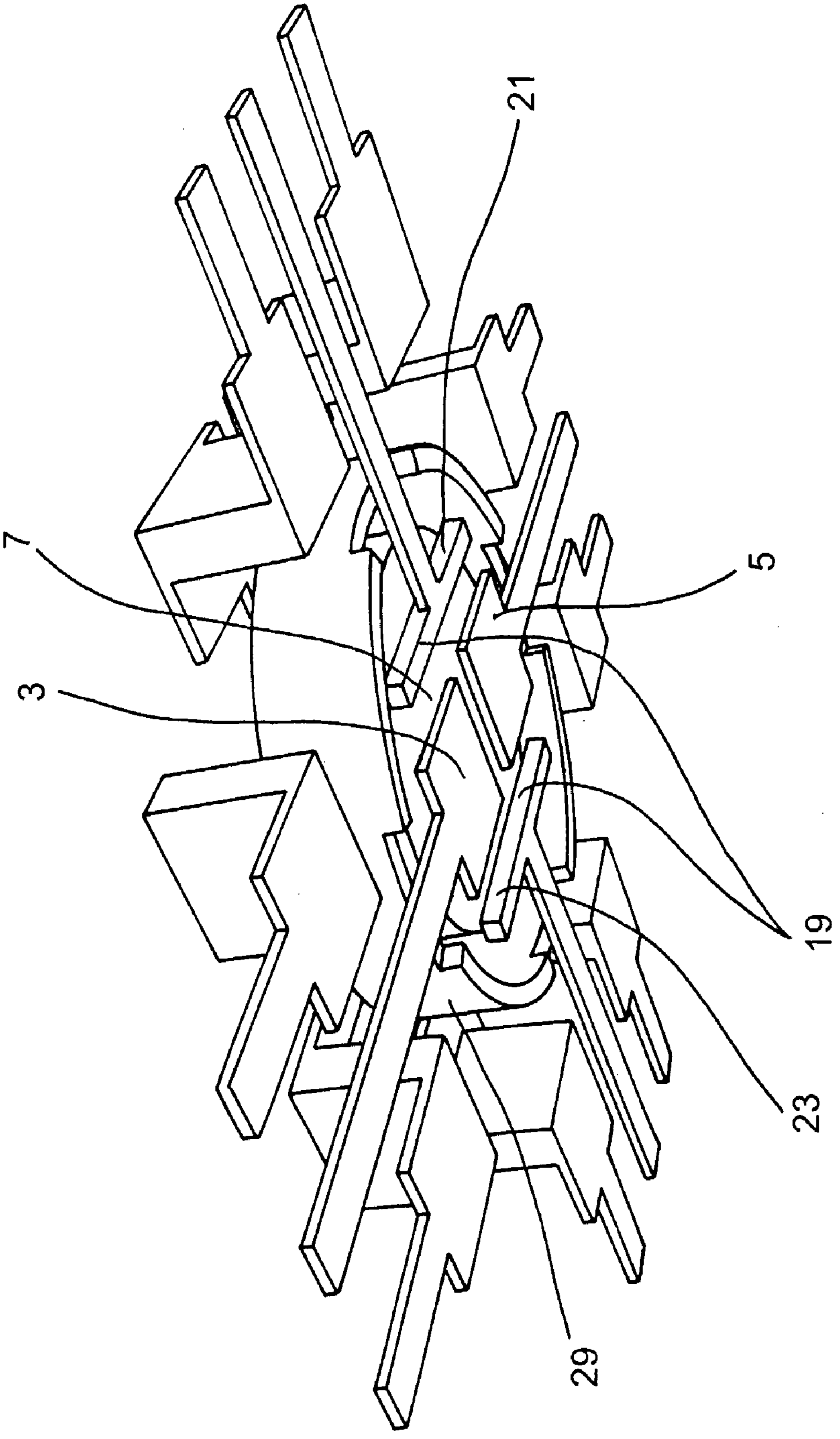
FIG. 21, a perspective view from below, without substrate, of an eighth embodiment of a relay according to the invention.
Figure 22:
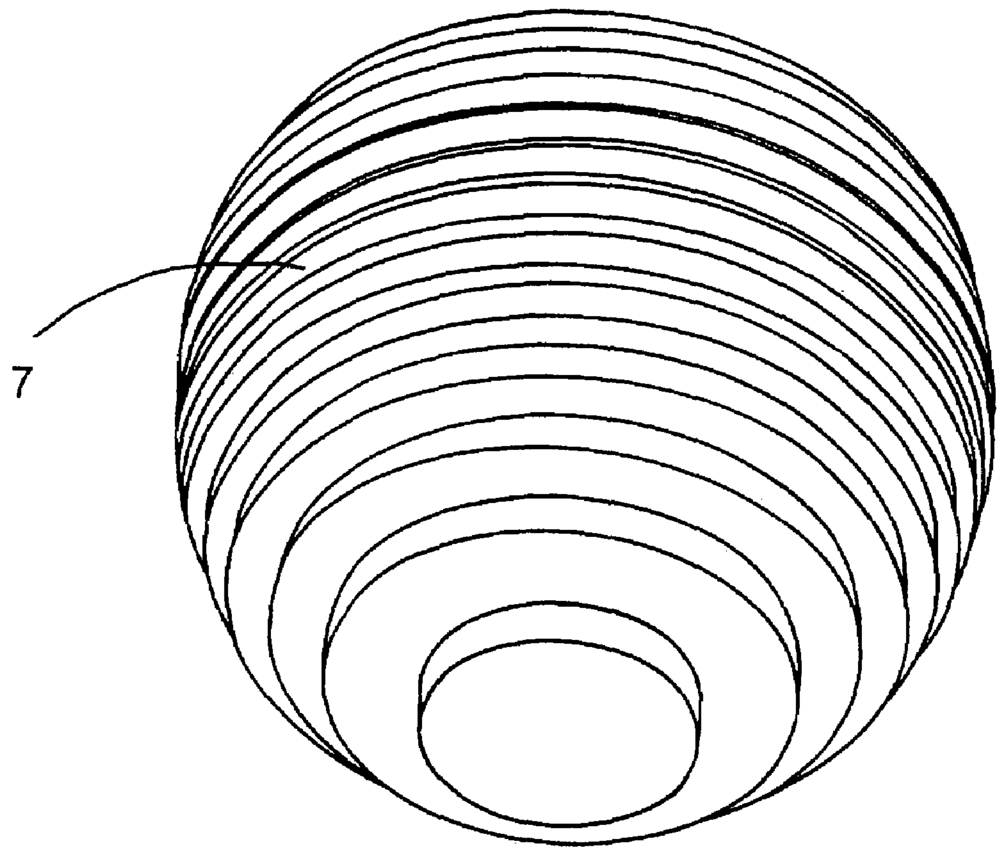
FIG. 22, a sphere produced with surface micromachining.

FIGS. 20 and 21 illustrate a relay in which the conductive element 7 is cylindrical. Referring to the relay of FIG. 20, the lateral walls 29 which surround the conductive element are parallelepipedic, whilst in the relay of FIG. 21 the lateral walls 29 which surround the conductive element 7 are cylindrical. With respect to FIG. 22, it shows a sphere manufactured by means of surface micromachining, it being noted that it is formed by a plurality of cylindrical discs of varying diameters. A relay with a spherical conductive element 7 such as that of FIG. 22 can be, for example, very similar conceptually to that of FIG. 20 or 21 replacing the cylindrical conductive element 7 by a spherical one. Should be taken into account however certain geometric adjustments in the arrangement of the condenser plates and the contact points in the upper end, to avoid the spherical conductive element 7 first touching the condenser plates and not the contact points or, as the case may be, the corresponding stops.

Figure 23:
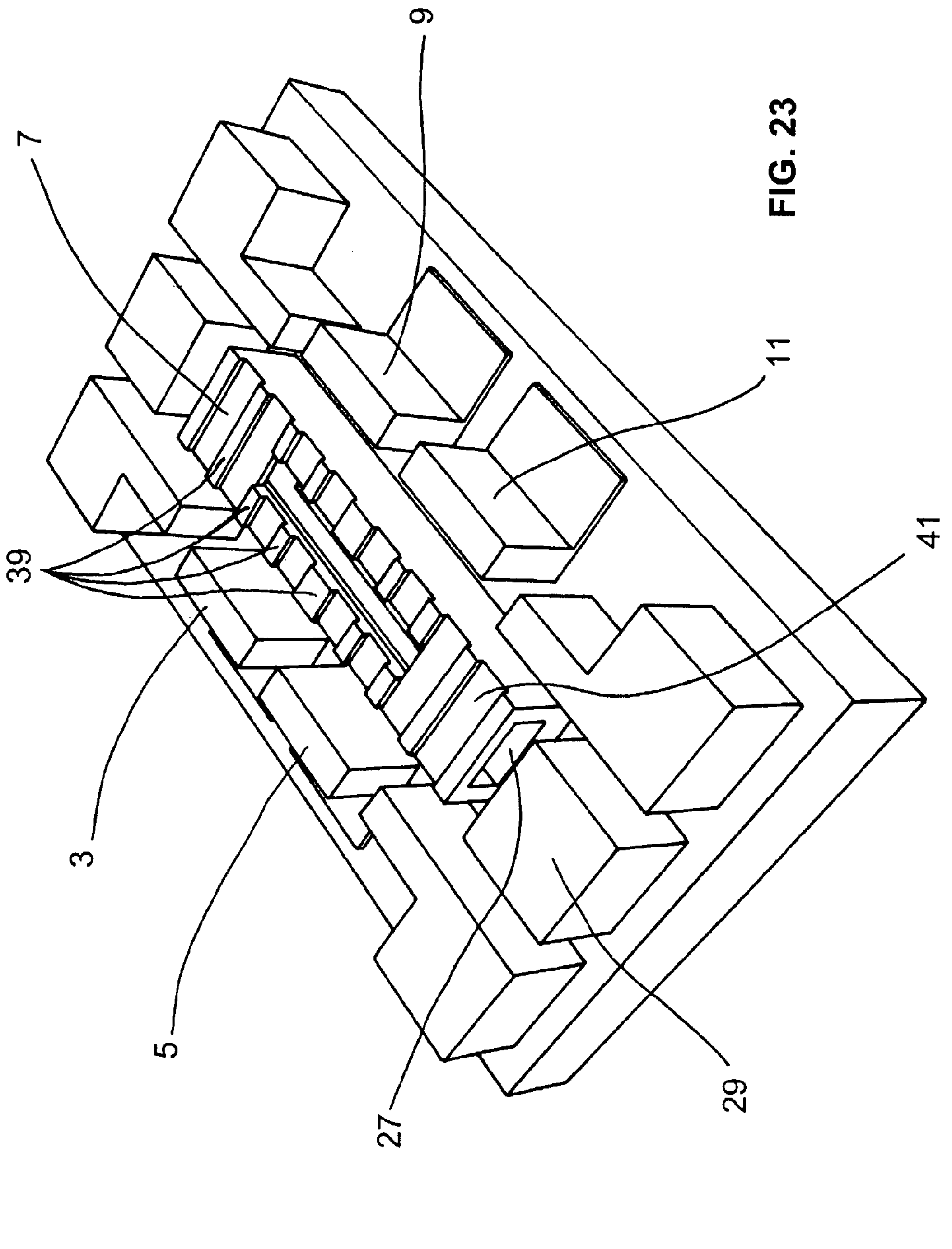
FIG. 23, a perspective view of a ninth embodiment of a relay according to the invention.

FIG. 23 shows a variant of the relay illustrated in FIGS. 10 and 11. In this case the conductive element 7 has protuberances 39 in its lateral faces 41.

As it can be observed, the invention is particularly interesting as a MEMS device. By means of this technology it is possible to include a high amount of antennas (for example dipoles) in a silicon wafer of reduced dimensions. In this manner an integrated circuit having the performances of a highly directive antenna can be obtained. In the event of using the solutions that comprise arrays of fixed antennas that simulate a periodic movement, it can be observed that the solutions proposed with MEMS relays are particularly interesting, as extremely compact and highly directive antennas with costs that make them interesting for several applications can be designed and manufactured. Depending on the technologies used both for manufacturing MEMS components (antennas, micromotors, relays) and for manufacturing the corresponding control circuits, monolithic or hybrid integrated circuits can be manufactured. Moreover, it must be taken into account that the devices according to the invention are highly directive at low frequency, and that makes them particularly interesting for many applications.

The invention claimed is:

1. An electromagnetic signal emitting and/or receiving device defining a minimum operational bandwidth, the device comprising:

a first array of antennas; and at least one of a mechanism unit for moving said first array of antennas and a control circuit for connecting and disconnecting a plurality of mutually-connected static antennas in the first array of antennas, wherein said first array of antennas generates an output signal corresponding to an output signal generated by a hypothetical antenna, which corresponds I to an antenna in the first array of antennas, when said hypothetical antenna is performing a first periodic movement having a first frequency higher than said minimum operational bandwidth, wherein the mechanism unit capable of moving the first array of antennas according to the first periodic movement and the control circuit capable of connecting and disconnecting the mutually-connected static antennas in a specific sequence.

2. Device according to claim 1, further comprising a plurality of arrays of antennas, each of said arrays at least having one antenna, wherein each of said arrays generates an output signal corresponding to the output signal generated by said hypothetical antenna when said hypothetical antenna is performing a periodic movement, wherein said periodic movement has a frequency higher than said minimum operational bandwidth and wherein the frequencies corresponding to each of said output signals are different with respect to one another.

3. Device according to claim 2, wherein at least one of said arrays of antennas is perpendicularly oriented and lagged 90° with respect to another of said arrays of antennas.

4. Device according to claim 1, wherein said periodic movement is a rotation.

5. Device according to claim 1, wherein said periodic movement is a plurality of rotations.

6. Device according to claim 2, wherein the antenna or antennas of at least one of said arrays performs the corresponding periodic movement.

7. Device according to claim 6, wherein said antenna or antennas are moved by micromotors.

8. Device according to claim 2, wherein at least one of said arrays includes a plurality of fixed antennas oriented in a space in a different way with respect to one another, so that each of said antennas has an orientation coinciding with one of the momentary orientations of the corresponding hypothetical antenna.

9. Device according to claim 1, further comprising a transformer circuit that modifies the array output signal of at least one array of antennas or the local output signal of at least one antenna so that said array output signal or said local output signal can have negative and positive values.

10. Device according to claim 9, wherein said transformer circuit reverses the polarity of said array output signal or said local output signal.

* * * * *